United States Patent
Bartolucci et al.

(10) Patent No.: US 11,632,390 B2
(45) Date of Patent: Apr. 18, 2023

(54) SYSTEMS AND METHODS OF PROPAGATING DATA PACKETS IN A NETWORK OF NODES

(71) Applicant: nChain Licensing AG, Zug (CH)

(72) Inventors: Silvia Bartolucci, London (GB); Simone Madeo, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/057,971

(22) PCT Filed: May 9, 2019

(86) PCT No.: PCT/IB2019/053825
§ 371 (c)(1),
(2) Date: Nov. 23, 2020

(87) PCT Pub. No.: WO2019/224643
PCT Pub. Date: Nov. 28, 2019

(65) Prior Publication Data
US 2021/0226986 A1    Jul. 22, 2021

(30) Foreign Application Priority Data
May 23, 2018 (GB) .................................. 1808493

(51) Int. Cl.
*H04L 9/40* (2022.01)
*G06F 16/27* (2019.01)

(52) U.S. Cl.
CPC .......... *H04L 63/1441* (2013.01); *G06F 16/27* (2019.01); *H04L 63/0421* (2013.01)

(58) Field of Classification Search
CPC ............. H04L 63/1441; H04L 63/0421; H04L 9/50; H04L 63/18; G06F 16/27
See application file for complete search history.

(56) References Cited

U.S. PATENT DOCUMENTS 6,778,535 B1* 8/2004 Ash ..................... H04L 45/10
370/238.1
6,981,055 B1* 12/2005 Ahuja ................... H04L 45/42
709/239

(Continued)

OTHER PUBLICATIONS

Lu et al., "An Optimized Algorithm of P2P Network Routing base on Geographic Position", Aug. 2009, ISECS International Colloquium on Computing, Communication, Control, and Management, pp. 536-539 (Year: 2009).*

(Continued)

*Primary Examiner* — Kenneth W Chang
(74) *Attorney, Agent, or Firm* — Davis Wright Tremaine LLP

(57) ABSTRACT

A method for propagating data packets in a network of nodes is disclosed. The method includes: collecting a set of first data packets during a first time period, the set including at least one first data packet received from one or more first nodes in the network; determining an available bandwidth in the network node's links to a plurality of neighbouring nodes connected to the network node; determining a mapping that assigns each of the first data packets for relay to one or more neighbouring nodes, the mapping indicating an expected time of relay of each of the first data packets, wherein determining the mapping includes using the available bandwidth as a basis for setting, for each of the first data packets, at least one of: a first number of peer nodes to which the first data packet is assigned for relay by the mapping; a first length of time delay in relaying the first data packet to one or more peer nodes; and a number of hops the first data packet travels from the network node, and transmitting the first data packets of the set to the plurality of neighbouring nodes according to the determined mapping.

18 Claims, 15 Drawing Sheets

(56) References Cited

U.S. PATENT DOCUMENTS

| | | | |
|---|---|---|---|
| 2003/0128687 A1 | 7/2003 | Worfolk et al. | |
| 2004/0044761 A1* | 3/2004 | Phillipi | H04L 67/63 709/223 |
| 2004/0114569 A1* | 6/2004 | Naden | H04L 45/08 370/351 |
| 2012/0297405 A1 | 11/2012 | Zhang et al. | |
| 2014/0229581 A1* | 8/2014 | Medved | H04L 69/321 709/219 |
| 2016/0021014 A1* | 1/2016 | Wetterwald | H04L 47/2441 370/235 |

OTHER PUBLICATIONS

Fanti et al., "Deanonymization in the Bitcoin P2P Network," retrieved from https://papers.nips.cc/paper/6735-deanonymization-in-the-bitcoin-p2p-network.pdf, Dec. 9, 2017, 10 pages.

International Search Report and Written Opinion for Application No. PCT/IB2019/053825, dated Aug. 19, 2019, filed May 9, 2019, 11 pages.

Levis et al., "The Trickle Algorithm draft-ietf-roll-trickle-04," retrieved from https://datatracker.ietf.org/doc/html/draft-ietf-roll-trickle-04, Aug. 19, 2010, 13 pages.

UK IPO Search Report dated Nov. 13, 2018, Patent Application No. GB1808493.9, 4 pages.

\* cited by examiner

SYSTEMS AND METHODS OF PROPAGATING DATA PACKETS IN A NETWORK OF NODES

SYSTEMS AND METHODS OF PROPAGATING DATA PACKETS IN A NETWORK OF NODES

This invention relates generally to computer networks, and more particularly to methods and devices to propagate data in a network of nodes, electronic communications and networking technologies. It is particularly suited for use in relation to blockchain technologies. In particular, it relates to secure transmission of data, and for the reduction of potentially malicious events by third parties, i.e. attacks.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource. The term "Bitcoin" is intended to include all versions and variations of protocol/implementation/platform which derive from the (original) Bitcoin protocol/implementation/platform.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction-if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One of the perceived advantages of blockchain technology, such as Bitcoin, is the anonymity of transactions. Personal details of a Bitcoin user are not formally and explicitly attached to Bitcoin addresses, and the Bitcoin ledger of the blockchain only contains public address information. However, since a blockchain is structured as a distributed, peer-to-peer network operating on top of the Internet, anonymity of transactions may be compromised by attacks that use Internet Protocol (IP) address information to link users with network activity. By way of illustration, de-anonymization attacks, such as IP traffic analysis, conducted on a blockchain-based network may enable interested third-parties to monitor transactions submitted by users on the network and use publicly available information to link the transactions to their sources, for example, by linking user's public keys with their IP addresses.

Traffic analysis is particularly problematic for a blockchain-based network, which relies on propagation of transactions by and between network nodes. Each node in the network that receives a transaction validates the transaction and subsequently sends it to peer nodes. In the Bitcoin protocol, a node will send an "INV" message containing a list of transactions to a peer node and receive a "GETDATA" response message selecting some subset of the transactions advertised in the "INV" message. The node then sends the requested transactions to the peer node. This process is carried out with respect to each peer node to which the node is connected. An attacker may intercept and analyse data that is transmitted when transactions are propagated in the network, and ultimately gain information which can be used to link sources and destinations of transactions.

It would be desirable to provide techniques for propagating transactions in blockchain-based networks which can reduce the likelihood of compromise of network anonymity through traffic analysis or other types of de-anonymization attacks. More generally, it would be desirable to provide techniques for relaying data between nodes of a peer-to-peer network to reduce the vulnerability to de-anonymization attacks.

Such a solution has now been devised.

Thus, in accordance with the present invention there are provided methods and devices as defined in the appended claims.

The present invention may provide a computer-implemented method of propagating data packets in a network of nodes. The method may include: collecting, at a network node, a set of first data packets during a first time period, the set including at least one first data packet received from one or more first nodes in the network; determining an available bandwidth in links of the network node to a plurality of neighbouring nodes connected to the network node; determining a mapping that assigns each of the first data packets for relay to one or more neighbouring nodes, the mapping indicating an expected time of relay of each of the first data packets. The determination of the mapping may include using the available bandwidth as a basis for setting, for each of the first data packets, at least one of: a first number of peer nodes to which the first data packet is assigned for relay by the mapping; a first length of time delay in relaying the first data packet to one or more peer nodes; and a number of hops of the first data packet from the network node. The method may further include transmitting the first data packets of the set to the plurality of neighbouring nodes according to the determined mapping.

In some implementations, determining the available bandwidth may include obtaining an indicator of available bandwidth in each of at least one of the network node's links to the plurality of neighbouring nodes.

In some implementations, determining the mapping may include: determining, based on the available bandwidth, a range of possible values for a number of peer nodes to which the first data packet is assigned for relay by the mapping; and selecting a number in the determined range to set as the first number of peer nodes.

In some implementations, the method may further include identifying, for at least one first data packet selected from the set of first data packets: a first set of peer nodes to which the at least one first data packet is assigned for relay; and a second subset of the first set, the second subset including only those peer nodes that are designated to relay the at least one first data packet to their own neighbouring nodes upon receiving the at least one first data packet from the network node.

In some implementations, transmitting the first data packets of the set to the plurality of neighbouring nodes according to the determined mapping may include, for the at least one first data packet: transmitting, to peer nodes included in the second subset, the at least one first data packet; and transmitting, to peer nodes of the first set that are not included in the second subset, a modified data packet, the modified data packet including the at least one first data packet that is modified to indicate that further relays of the at least one first data packet to peer nodes are prohibited.

In some implementations, the method may further include setting an additional bit in the at least one first data packet to indicate that further relays of the at least one first data packet to peer nodes are prohibited.

In some implementations, the at least one first data packet may be selected arbitrarily from the set of first data packets.

In some implementations, the at least one first data packet may be selected based on determining that the at least one first data packet had previously been transmitted by the network node to one or more peer nodes.

In some implementations, transmitting the first data packets of the set to the plurality of neighbouring nodes according to the determined mapping may include, for each of one or more first data packets of the set: determining a next scheduled time of relay of the first data packet to neighbouring nodes; and relaying the first data packet at a point in time that is the first length of time after the next scheduled time of relay of the first data packet.

In some implementations, the first length of time may be inversely proportional to the available bandwidth.

In some implementations, the network node may be configured to generate at least one first data packet and determining the mapping may include, for each of the at least one generated first data packet: identifying a predetermined number of first data packets that were previously generated by the network node; obtaining a list of relay node sets associated with the previously generated first data packets, the relay node sets including neighbouring nodes to which the previously generated first data packets are respectively relayed; and selecting a first set of relay nodes based on identifying a set of neighbouring nodes that is different from the relay node sets in the obtained list.

In some implementations, selecting the first set of relay nodes may include arbitrarily selecting a set of two or more neighbouring nodes that is not included in the obtained list.

In some implementations, the method may further include detecting a change in the available bandwidth in links of the network node to the plurality of neighbouring nodes, wherein determining the mapping includes using an updated indication of available bandwidth as a basis for setting, for each of the first data packets, at least one of: a first number of peer nodes to which the first data packet is assigned for relay by the mapping; a first length of time delay in relaying the first data packet to one or more peer nodes; and a number of hops of the first data packet from the network node.

The present invention may provide a computer-implemented system for carrying out a method in accordance with the foregoing or elsewhere herein.

The present invention may provide a non-transitory computer-readable storage medium storing instructions for adapting a computer system to perform a method in accordance with the foregoing or elsewhere herein.

The present application provides techniques for bandwidth management during propagation of data in a network of nodes. The relay of data packets by a node to its peers can be controlled to account for bandwidth availability in the node's links to its neighbouring nodes. The node may thus be able to adapt in real-time to changes in its bandwidth availability and update its data relay assignments accordingly. The techniques and heuristics described herein may also lead to reductions in redundant relays in the data propagation process, facilitating improvements in network traffic and usage of node-to-node bandwidth.

The present application also describes solutions for providing node-level anonymization in a network. More particularly, the methods and systems described herein facilitate obfuscating the functions of nodes in a data propagation scheme within a network. Even if an attacker were to monitor inter-node traffic in a network or gain access to neighbouring nodes of specific nodes, the present methods make it challenging for such an attacker to determine whether a particular node is the source or a relaying node for data packets that are being propagated in the network. By obfuscating the functions/roles of nodes in a blockchain network, the efficacy of de-anonymization attacks on the network may be reduced and security of data transmission on the blockchain may be improved.

Furthermore, the techniques of the present application enable a node to manage bandwidth usage of its links to neighbouring nodes while facilitating maintaining the anonymity of the sources and destinations of data packets relayed by the node. By taking into account the constraints on a node's resources (e.g. bandwidth), a more realistic and practical scheme for data propagation may be obtained. These techniques also proffer entities that control the nodes of a network the ability to set the parameters of data propagation protocols as desired, according to their preferences and needs.

In many of the example implementations described herein, specific reference is made to blockchain transactions; however, it will be appreciated that the methods and devices described herein may be implemented and applied in connection with non-blockchain transactions propagation. More generally, the methods and devices described in the present disclosure may be suitable for use in propagating various different types of data among the nodes of a peer-to-peer network.

Any feature described in relation to one aspect or embodiment of the invention may also be used in respect of one or more other aspects/embodiments. These and other aspects of the present invention will be apparent from, and elucidated with reference to, the embodiments described herein. An embodiment of the present invention will now be described, by way of example only, and with reference to the accompanying drawings, in which:

FIG. 1 illustrates an example network associated with a blockchain.

FIG. 2 diagrammatically shows an example blockchain node with an input buffer and an output buffer.

Figure 1:
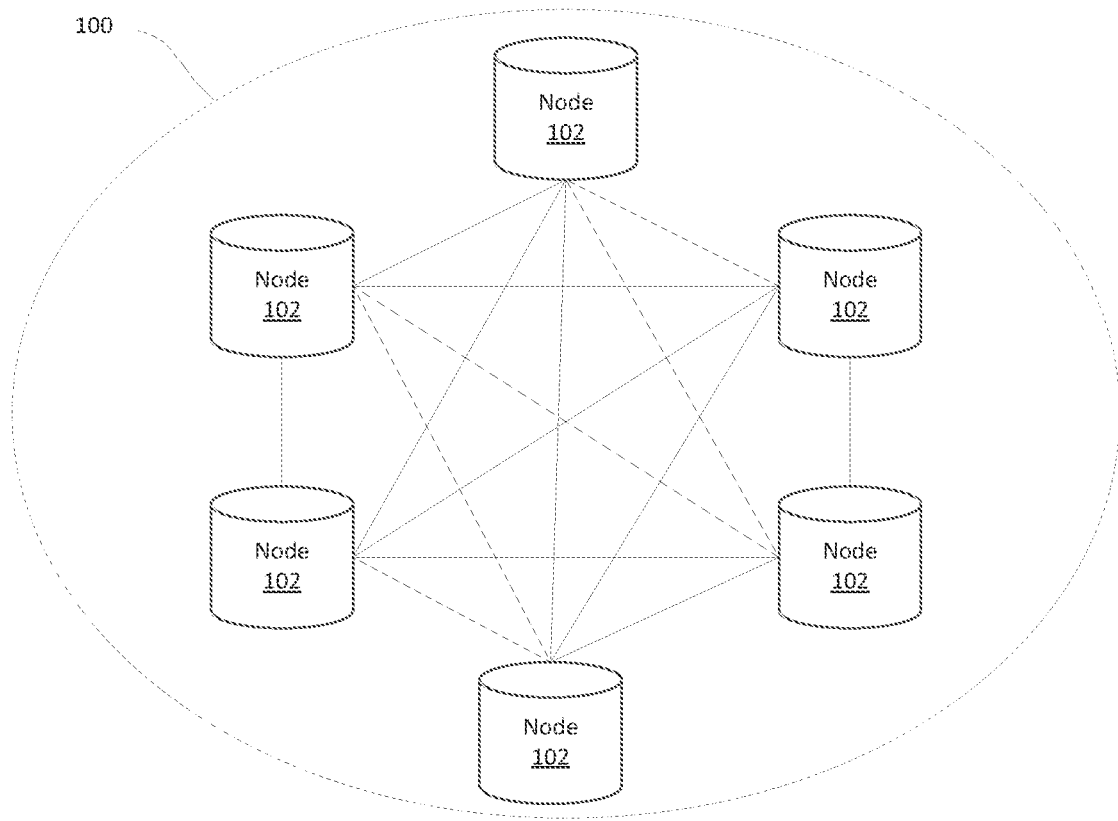

Reference is first made to FIG. 1 which illustrates, in block diagram form, an example network associated with a blockchain, which may be referred to herein as a blockchain network 100. The blockchain network 100 is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the nodes 102 may be located in geographically dispersed locations.

Nodes 102 maintain a global ledger of all transactions on the blockchain, grouped into blocks, each of which contains a hash of the previous block in the chain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output (UTXO). A subsequent transaction may then reference that address as an input in order to spend or disperse that value.

Nodes 102 can fulfil numerous different functions, from network routing to wallet services, to maintain a robust and secure decentralized public ledger. "Full nodes" contain a complete and up-to-date copy of the blockchain, and can therefore verify any transactions (spent or unspent) on the public ledger. "Lightweight nodes" (or SPV) maintain a subset of the blockchain and can verify transactions using a "simplified payment verification" technique. Lightweight nodes only download the headers of blocks, and not the transactions within each block. These nodes therefore rely on peers to verify their transactions. "Mining nodes", which can be full or lightweight nodes, are responsible for validating transactions and creating new blocks on the blockchain. "Wallet nodes", which are typically lightweight nodes, handle wallet services of users. Nodes 102 communicate with each other using a connection-oriented protocol, such as TCP/IP (Transmission Control Protocol).

When a node wishes to send a transaction to a peer, an "INVENTORY" message is sent to the peer, transmitting one or more inventory objects that is known to the transmitting node. If the peer replies with a "GETDATA" message, i.e. a full transaction request, the transaction is sent using a "TRANSACTION" message. The node receiving the transaction forwards it in the same manner-given that it is a valid transaction-to its peers.

Figure 2:
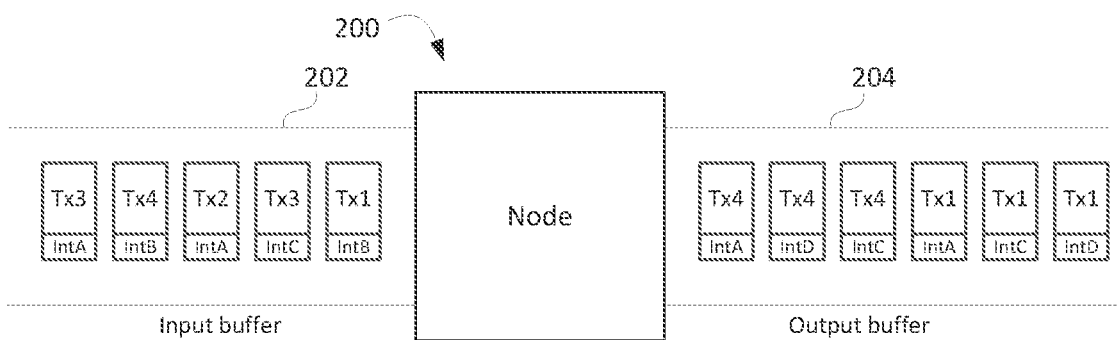

Reference is now made to FIG. 2, which diagrammatically shows an example node 200 with an input buffer 202 and an output buffer 204. The example node 200 has network interfaces with multiple peer nodes, referenced as intA, intB, intC, intD, etc. The input buffer 202 shows incoming transactions from the various peer nodes, and the output buffer 204 shows output network packets, corresponding to transactions, for transmission to peer nodes over the respective interfaces. Network packets are serially sent and received at an application-level according to the primitives provided by the operating system of the node 200. Assuming that a transaction $\chi$ fits in a single Ethernet/IP packet, its transmission to m peers requires the buffering of m different output network packets. Both input and output network packets, along with other information, will contain a serialized transaction and a logical interface ID representing the TCP/IP connection to the sending/receiving peer.

Once a Bitcoin transaction is generated, the source node broadcasts the transaction message over the network. Generally, when a client generates a transaction, it is put in the output buffer 204. The transaction may or may not be forwarded immediately to the peers. In current implementations of the Bitcoin network, transactions are propagated by a mechanism known as "diffusion propagation", whereby each transaction source transmits the transaction to its neighbours with an independent, exponential delay. The delays in propagation are random, and are useful to introduce uncertainty in timing estimates for a malicious attacker. Once a peer receives a certain transaction, the peer may not accept future relays of the same transaction; for example, the transaction hash may be stored in the peer's memory pool, allowing the peer to reject identical transactions. The "diffusion" of transactions through the network is symmetric, meaning that a forwarding node does not use information about the IP addresses of the neighbouring nodes to influence the transaction broadcast. For example, in "standard" diffusion processes (utilized in the Bitcoin protocol), the peers of a broadcasting node all receive the same transaction and in each relay instance only one transaction at a time is relayed per peer. The symmetric nature of this "diffusion" may be exploited by malicious third parties having knowledge of the peer-to-peer graph structure of the network in conducting de-anonymizing attacks.

The present disclosure provides alternative techniques for transactions relay on blockchain networks, to improve protection against traffic analysis attacks. More particularly, the proposed relay protocols may be used to disguise, conceal or obfuscate connections between source nodes of transactions and their IP addresses.

A transactions relay protocol, Diffusion Mixer Protocol (DMP), is proposed. DMP includes two independent diffusion stages. The first stage ("random differential relay", or RDR) allows for relayed transactions mixing and obfuscation of transaction sources. During the random differential relay stage, each node waits a predefined amount of time before broadcasting a transaction to the network, to receive and collect a plurality of transactions from its peers. The node then creates outgoing connections to its "entry nodes", and sends to an arbitrarily (e.g. randomly) selected subset of these entry nodes different transactions with approximately the same timestamps. Entry nodes of a node are those neighbouring nodes to which direct outgoing connections can be established from the node. The randomness in the choice of entry nodes and the diversity in the relayed transactions may make the reconstruction of the network topology more difficult for an attacker.

The second stage ("standard diffusion") ensures a timely and reliable propagation of transactions within the network. In the standard diffusion stage, each node relays the same transaction to all its entry nodes, and in each relay instance only one transaction at a time is relayed per entry node.

It should be noted that in a network of nodes, such as a blockchain network, one or more of the nodes may be capable of implementing the DMP. Specifically, one or more of the nodes of the network may be able to relay its received data packets to its entry nodes by participating in the DMP. A participating node may, for example, select between an RDR process and a standard diffusion process, for propagating a particular data packet. The nodes of the network may elect to participate in the DMP, joining the protocol either via a decentralized manner or through inclusion in a group of participating nodes assembled by a central authority. A participating node relays its output network packets according to the DMP. In particular, if a participating node receives a data packet, the node may forward the received data packet according to a mode of propagation that is selected for that node, using the rules stipulated by the DMP.

The proposed DMP for transactions relay is described with reference to FIGS. 3 to 7. A schematic visualization of the DMP is provided in FIG. 3. An example blockchain network 300 of nodes is shown. Each node represents a network terminal (i.e., a blockchain node), while edges represent links between nodes. For the purposes of this illustration, it is supposed that for each link, it is possible to send or receive a single bit at a time.

In this example network 300, each node maintains a set of unconfirmed transactions so that when a node receives a new transaction, it is propagated through the network to all other nodes. Each node is to validate and store the new transactions in their respective local set and forward the new transactions to any peer nodes that do not yet have the new transactions. Due to the peer-to-peer nature of the blockchain network 300, all nodes do not receive a new transaction at the same time, meaning it will take some time for a new transaction to reach all nodes in the network 300.

Figure 3:
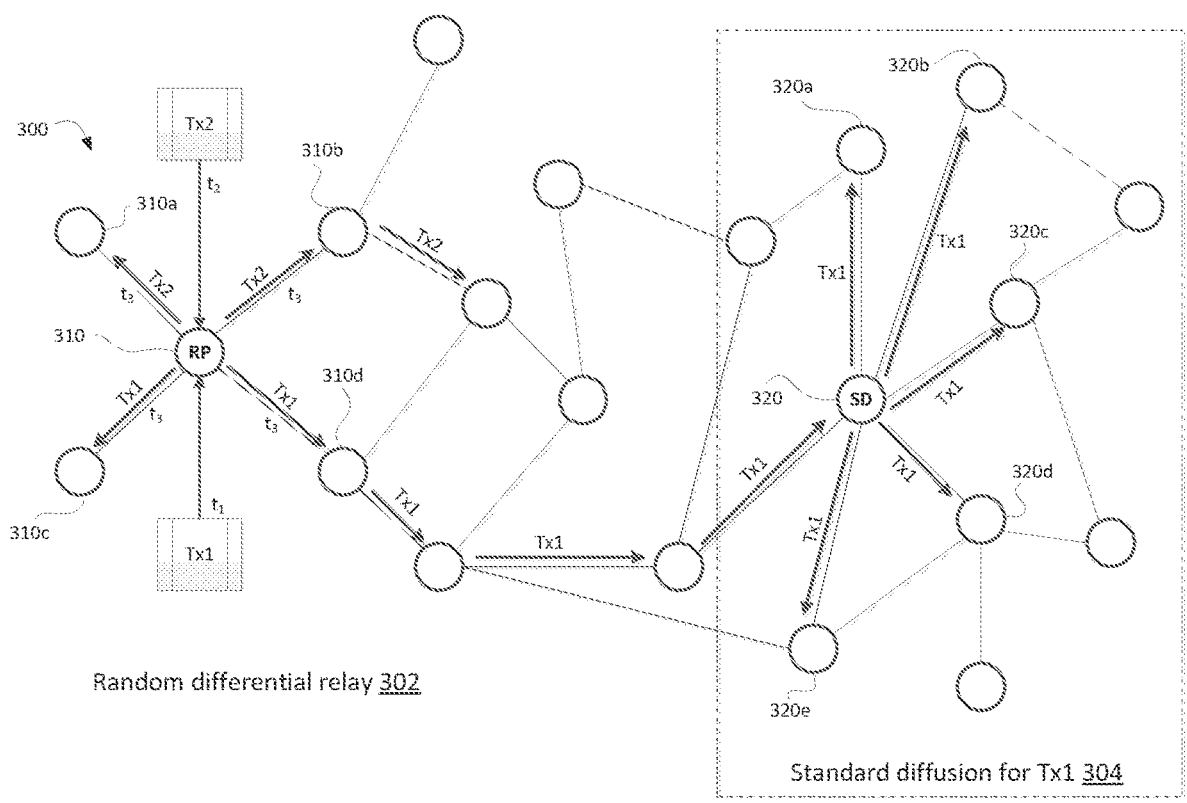
FIG. 3 is a schematic diagram of a protocol, Diffusion Mixer Protocol (DMP), for propagating a transaction in an example network of nodes.

FIG. 3 illustrates the two stages of the DMP for propagating a particular transaction Tx1, namely the random differential relay 302 and the standard diffusion 304 for Tx1. The source node 310 of transaction Tx1 may either generate the transaction Tx1 or receive it from a peer node, at a time, $t_1$. In accordance with the DMP, source node 310 waits to receive at least one more incoming transaction from its neighbouring nodes prior to initiating broadcast of the received/queued transactions. In the example of FIG. 3, once transaction Tx2 is received by source node 310 at time $t_2$, the transactions Tx1 and Tx2 are sent to an arbitrarily selected subset of the source node 310's entry nodes at time $t_3$. Transaction Tx1 is forwarded to entry nodes 310c and 310d, while transaction Tx2 is forwarded to entry nodes 310a and 310b. The example of FIG. 3 is only illustrative; in particular, the source node 310 may wait to receive more than two incoming transactions before propagating any of its received transactions.

The entry nodes relay the received transactions to their own peers. For example, nodes 310b and 310d forward transactions Tx2 and Tx1, respectively, to one or more of their neighbouring nodes. In the DMP, each recipient of a transaction independently selects a mode of propagating the received transaction. Node 320 is an example of a node which selects standard diffusion as its diffusion mode. As shown in FIG. 3, node 320 forwards the same transaction, Tx1, to all its entry nodes, namely 320a, 320b, 320c, 320d, and 320e.

Figure 5:
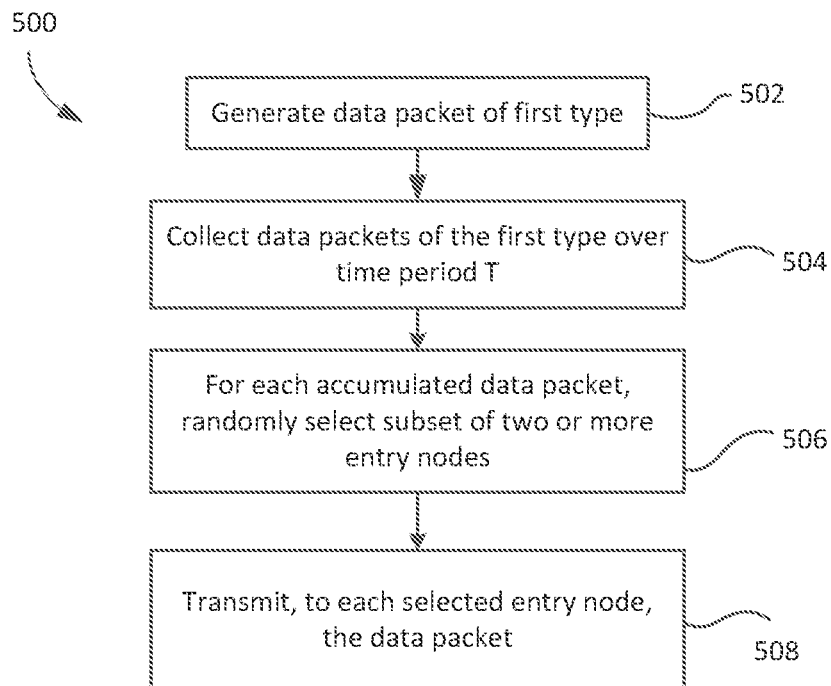
FIG. 5 shows, in flowchart form, an example process for propagating data packets in a blockchain network, in accordance with the DMP.

Reference is now made to FIG. 5, which shows, in flowchart form, an example method 500 for propagating data packets in a network, in the RDR stage of DMP. The method 500 is implemented by a node of, for example, a blockchain network, such as network 100. A node may be understood, in this context, to refer to a mining node, full node, validator node, or other type of discrete blockchain node in the blockchain network. The node is a computing device with network connection(s), computing resources, and executing software implementing the blockchain protocol.

In operation 502, the client associated with the node generates at least one data packet of a first type. In the context of a blockchain network, the data packet of a first type may comprise a blockchain transaction. That is, the client may generate a blockchain transaction which is to be propagated to the other nodes of the network.

In operation 504, the node collects a set of data packets of the first type during a first time period, T. That is, the node accumulates data packets of the first type over a period of time. The set includes the at least one generated data packet and at least one data packet of the first type that is received from one or more peer nodes in the network. In this way, the data packets generated by the node are mixed with those data packets of the same type that are received from neighbouring nodes. In a blockchain network, during the time period T, the node accumulates a set of transactions by monitoring the network for incoming transactions to be relayed. The length of time period T may be predefined. In some example implementations, the length of time may vary based on parameters such as average connection times, average number of transactions received per unit of time, or the node's centrality (i.e. the number of incoming connections to the node) within the network. During the time period T, the node may only be permitted to accumulate data packets of the first type, and therefore may be prevented from transmitting any data packets of the first type for the duration of time period T.

In operation 506, the node arbitrarily selects a subset of its entry nodes to which different sets of the collected data packets will be forwarded. More specifically, for each data packet in the set of collected data packets, the node arbitrarily selects two or more of its entry nodes (i.e. neighbouring nodes, with which the node has outgoing connections), and assigns the data packet to the selected entry nodes. For example, the entry nodes may be selected randomly. The node may, in some implementations, query the network to obtain fresh addresses of its peers. In the Bitcoin network, the node may query one or more database source names (DSN) embedded in Bitcoin Core, BitcoinJ, or other blockchain protocol, and maintained by Bitcoin (or other blockchain) community members. As a response, the node will get one or more DSN records showing the IP addresses of available full nodes which may accept incoming connections. A decentralized version of peer discovery may be implemented by having peers send "ADDR" messages containing their IP addresses and port numbers to a new node that joins the network.

Figure 4:
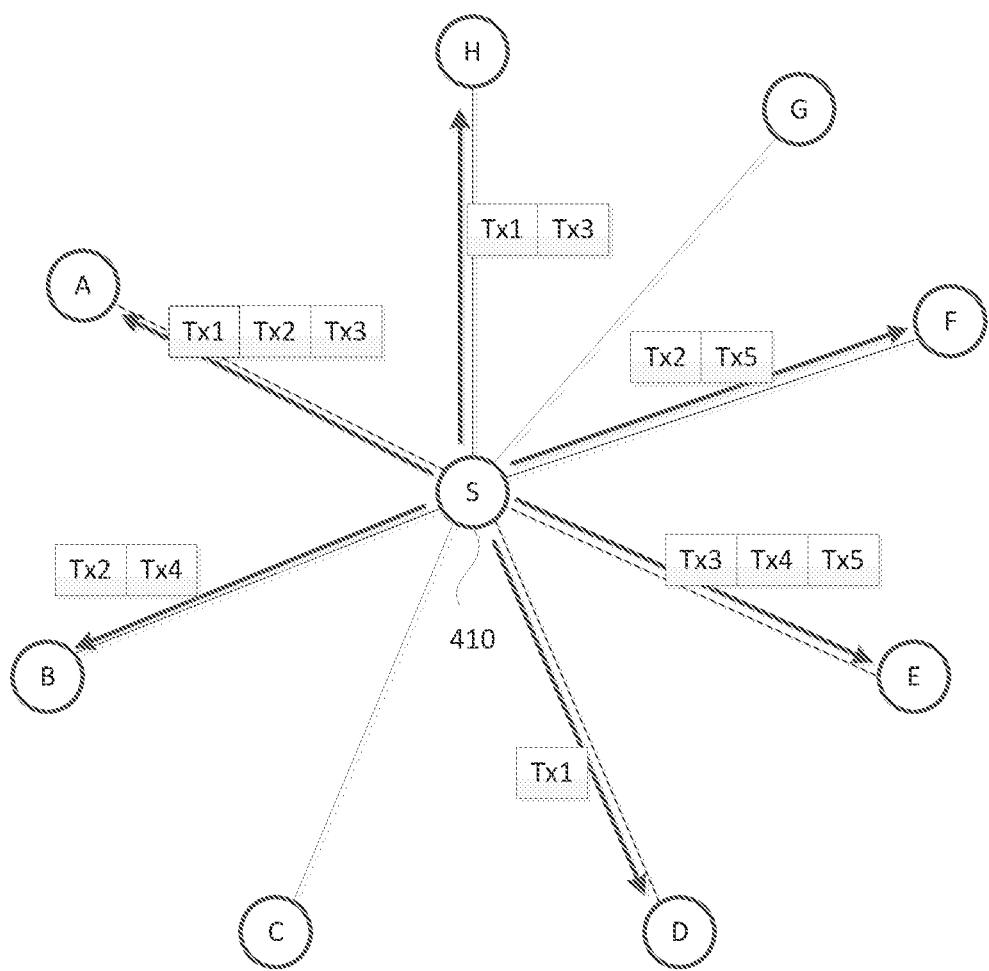
FIG. 4 illustrates an example of a relay of transactions in a network of nodes, in accordance with the DMP.

In some implementations, as part of operation 506, one or more of the nodes in a network may maintain a table or other data structure tracking its assignment of each collected data packet to an entry node that the data packet should be relayed to. FIG. 4 shows an example of transactions relay for source node 410 in the RDR stage of the DMP in a blockchain network. Table 1 is an example assignment of the collected transactions, Tx1-Tx5, to the entry nodes of source node 410. The entry nodes are indicated as nodes A, B, C, D, E, F, G, and H. As shown in FIG. 4 and Table 1, the source node 410 relays each transaction to at least two entry nodes, and multiple transactions can be relayed via the same node. For example, transactions Tx3, Tx4, and Tx5 are all simultaneously relayed via entry node E. More generally, in the RDR process, multiple data packets can be simultaneously relayed to the same peer node by a forwarding node. Not all entry nodes receive transactions from source node 410 in a given instance of the DMP. In the example of Table 1, entry nodes C and G do not receive any transactions from source node 410.

TABLE 1

| Transactions/Nodes | Relay 1 | Relay 2 | Relay 3 |
|---|---|---|---|
| Tx1 | Node A | Node D | Node H |
| Tx2 | Node E | Node B | Node F |
| Tx3 | Node E | Node A | Node H |
| Tx4 | Node B | Node E | |
| Tx5 | Node E | Node F | |

Referring again to FIG. 5, for each collected data packet, in operation 508, the node transmits the data packet to each of the (arbitrarily or randomly) selected entry nodes. Each selected entry node is configured to relay the data packet to one or more second nodes (e.g. peers of the entry node) in the network using a mode of data propagation that is randomly selected for that entry node. That is, each selected entry node forwards the received data packet to one or more of its own peers using a propagation mode that is independently chosen for that entry node. In the example transactions relay of FIG. 4, each of transactions Tx1-Tx5 is forwarded to the entry nodes to which the transaction is assigned.

Each node receiving a transaction from source node 410 then randomly selects a mode of propagation/diffusion to use in forwarding the received transaction to one or more of its peer nodes (if any). In particular, an entry node that receives a transaction selects, on a random basis, between relaying the transaction according to the standard diffusion process or the RDR process. The choice between the two options is random. Thus, in the DMP, the two diffusion processes alternate probabilistically, i.e. there is not a clear separation between the RDR stage and the standard diffusion stage. As a result of this "mixing" of diffusion processes, it becomes more difficult for an attacker to reconstruct a topology of the network based on identifying a separation between the sets of nodes relaying via random data propagation or via standard diffusion.

In some implementations, the random selection by an entry node of the diffusion mode may involve receiving, from the source node, a message in addition to the relayed data packet. The entry node may then generate a random value (e.g. random number), append it to the received message, and hash the result, for example, using SHA-256. The entry node can then check the hash value and subsequently obtain the diffusion mode based on predetermined rules regarding the hash value (e.g. if the final character of the hash is a digit, select the RDR as mode of diffusion). Alternatively or additionally, the selection of the diffusion mode can be done using any randomized process (e.g. random number generator), where the probability of selecting one of the modes may be greater than that of selecting the other of the modes, depending on factors such as number of incoming and/or outgoing connections, average number of data packets received per unit of time, etc.

In propagating a particular data packet, it may be desirable to balance the level of anonymity protection for the propagating nodes with the overall speed of propagation. If the measures to ensure a certain level of anonymity are too cumbersome (e.g. requires too many network resources, nodes of the network are intentionally underutilized in relaying data packets, etc.), the efficacy of the network in timely spreading data may be impaired. Accordingly, in some implementations, the random selection of the mode of propagation by a relaying node may be weighted. In particular, different probabilities may be assigned to each of the two or more modes of propagation (i.e. RDR, standard diffusion, etc.) so that the probabilities reflect the proportional significance of anonymity and speed of data propagation. For example, in some instances, a higher predefined probability may be associated with the RDR mode for the nodes of a particular network, reflecting a proportionally greater emphasis on preserving anonymity of the propagated data.

Figure 6:
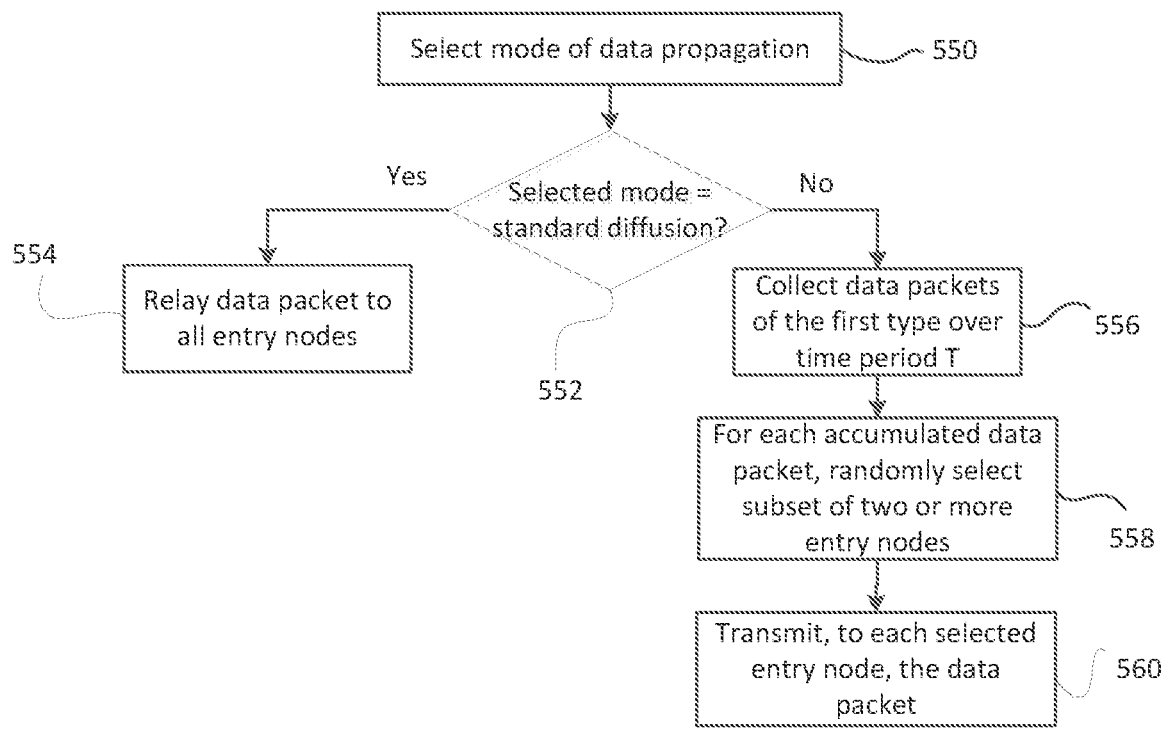
FIG. 6 shows, in flowchart form, another example process for propagating data packets in a blockchain network, in accordance with the DMP.

The method 500 of FIG. 5 is implemented by a node which generates its own data packet of a first type. In particular, a node that participates in the DMP and generates a data packet for propagation to the rest of the network performs the method 500. FIG. 6 shows an example process performed by a relay node, or a node which forwards or relays a data packet that is generated by a different node. That is, a relay node is a node that does not itself generate data to transfer during the relay of a specific data packet, instead serving the function of "relaying" the data packet. In operation 550, the relay node independently selects its own mode of data propagation. A relay node may, for example, select between a RDR mode and standard diffusion mode. If the standard diffusion mode is selected (which may be determined at operation 552), the relay node forwards the data packet to all of its entry nodes in operation 554. In the example of FIG. 6, the selection of propagation mode is between two possible options; this example is not limiting and in other examples, there may be three or more possible modes of propagation. If, in the method 500 the selected mode is RDR (which may be determined at operation 552), the relay node performs the steps 556, 558 and 560 which correspond to the operations 504, 506 and 508 of FIG. 5.

Figure 7:
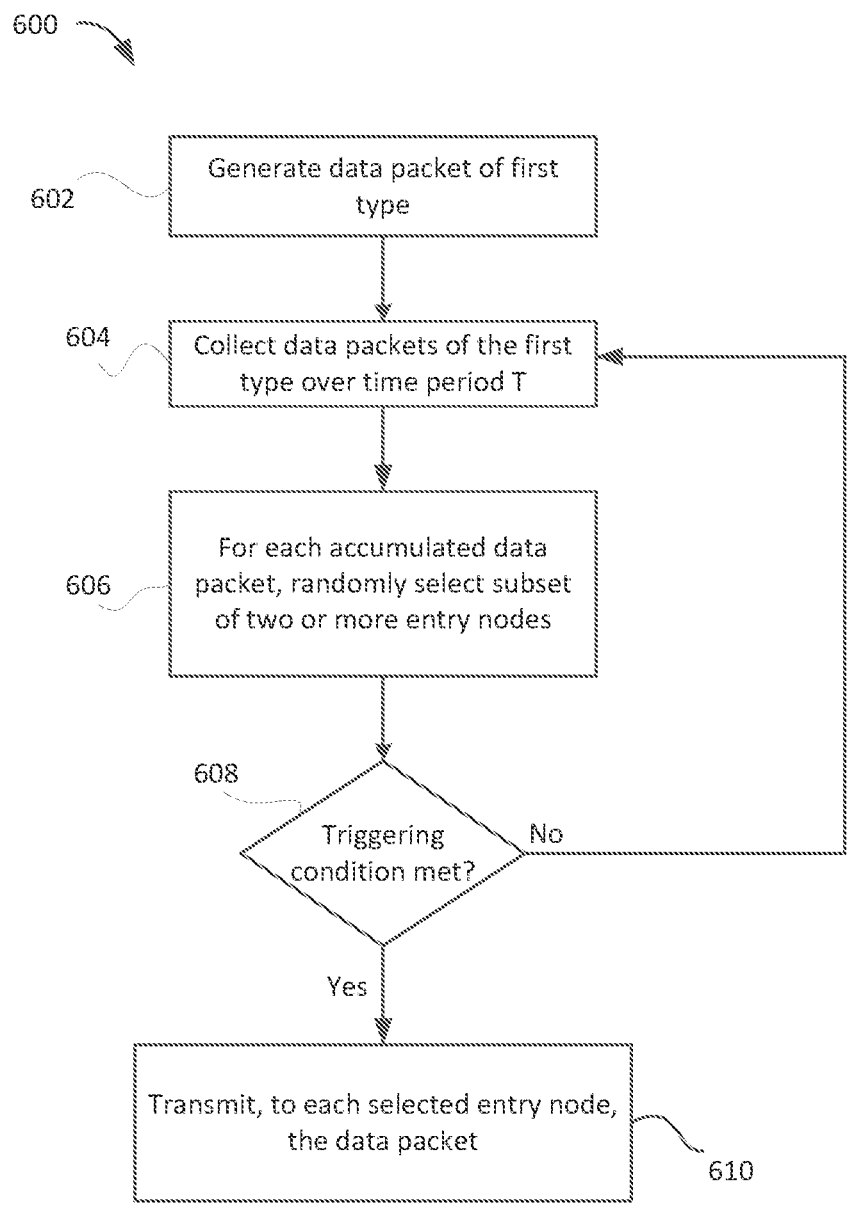
FIG. 7 shows, in flowchart form, another example process for propagating data packets in a blockchain network, in accordance with the DMP.

Reference is now made to FIG. 7, which shows, in flowchart form, an example process 600 for propagating data packets in a network. The process 600 may be implemented at a blockchain node having a plurality of incoming and outgoing connections to other nodes of a blockchain network.

Operations 602, 604, 606 and 610 of process 600 correspond to operations 502, 504, 506 and 508 of method 500, respectively. In operation 608, the node determines whether a triggering condition has been met, prior to transmitting a collected data packet to its assigned entry node in operation 610. In particular, the transmitting of the data packet is performed in response to detecting that a suitable triggering condition has been satisfied. When the triggering condition has not been met, the node continues to collect data packets of the first type without relaying any of said data packets to its entry/peer nodes.

A triggering condition may be employed to direct the node to collect a sufficient number of incoming data packets and/or to collect incoming data packets for a sufficient amount of time. For example, sufficiency may be determined based on a defined threshold. By collecting a plurality of incoming data packets prior to, for example, simultaneously propagating them to peer nodes in the network, an attacker that monitors the relay traffic originating from the node may not be able to easily identify the node as the correct source of the relayed data packets.

In some implementations, the triggering condition may be the expiry of a predetermined duration since the time of generation of the at least one data packet of the first type by the node in operation 602. That is, the node may be designed to monitor and collect incoming data packets (e.g. transactions) for a predetermined period of time that begins when the node generates a data packet of the same type, before any of said data packets are propagated by the node. This condition may be useful in trying to ensure that a data packet that is generated by the node is propagated after having collected more data packets of the same type that can be simultaneously broadcasted, thereby rendering it difficult for an attacker to correctly identify the node as the source of the generated data packet.

In some implementations, the triggering condition may be the expiry of a predetermined duration since the time of receipt of a first of the at least one incoming data packet of the first type from the node's peers. That is, the node may be designed to monitor and collect incoming data packets for a predetermined period of time that begins when a first of such incoming data packets is received. This condition may be useful in trying to ensure that more data packets, either data packets generated by the node itself or received from other peers, are collected by the node prior to any broadcast to the rest of the network.

In some implementations, the triggering condition may be the number of collected data packets during the first time period reaching a threshold number. In particular, the node may be designed to monitor and collect incoming data packets until the earlier of the expiry of the first time period or a predetermined threshold number of data packets being collected by the node.

Heuristics for Random Differential Relay (RDR)

As described above, random differential relay represents a departure from the "standard diffusion" protocol for propagating transactions in a network of nodes. In implementing RDR, a propagating node relays different transactions simultaneously to a randomly selected subset of entry nodes. The propagating node may create a data structure, such as the data structure illustrated in Table 1, by randomly assigning to each collected transaction one or more entry nodes that the transaction should be relayed to. More generally, a network node that relays data packets to its peers may maintain its own internal routing data structures which specify the type of relay to perform for each of a plurality of data packets collected (i.e. received or locally generated) by the node.

In the context of the Diffusion Mixer Protocol proposed herein, each node in the blockchain network that implements RDR may build its own routing data structure, or "RDR table", independently. An RDR table defines a transaction allocation scheme for each node that adopts the RDR protocol. That is, an individual node's RDR table is used to manage what transactions are to be relayed to which peer and when. The RDR table may keep track of all the transactions received or generated in a given amount of time, $\Delta T_{RDR}$, as well as the source peers of transactions. An RDR table may include additional information, such as: time of arrival of the first instance of a transaction ("ToA timestamp"); times chosen for relaying a transaction ("ToR timestamp"); and/or counter of the number of instances of the same transaction received by the node. An example RDR table is provided below.

TABLE 2

| Transaction ID | Sources | Destinations | Data |
|---|---|---|---|
| $tx_1$ | a, b, d | c, e | . . . |
| $tx_2$ | [local] | a, c, e | . . . |
| $tx_3$ | d, e | a, b | . . . |

A node's local RDR table may be updated dynamically (i.e. in real-time) as new information (timeouts, transactions received or generated) becomes available. The present disclosure provides various heuristics, or "sub-systems", which contribute to the building and updating of individual RDR tables. These sub-systems can be considered as sets of rules or guidelines which may be applied to update transaction allocations as specified in RDR tables. The strategies encompassed by these sub-systems may be useful in enhancing transaction source obfuscation and balancing network traffic generated by the relay operations of an individual node. The proposed set of sub-systems, namely source mixing, relay mixing, destination mixing, time-of-arrival mixing, and source control, may work in parallel, while a load balancing module can be used to merge the transaction relay information collected and provide an optimized allocation of network resources.

Figure 8:
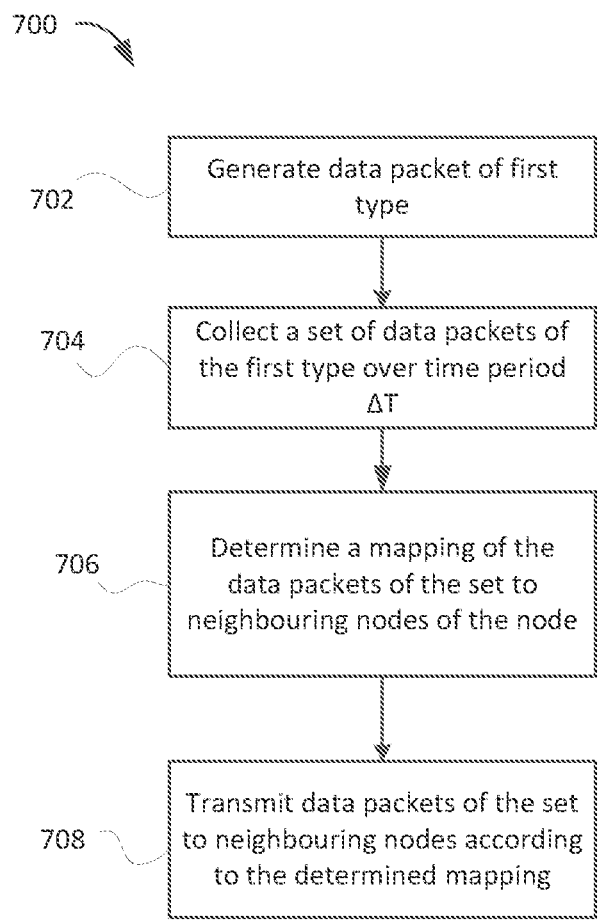
FIG. 8 shows, in flowchart form, an example process for transmitting data packets generated or received at a node in a blockchain network.

Reference is now made to FIG. 8, which shows in flowchart form, an example method 700 for transmitting data packets that are either generated or received at a node in a network. The method 700 represents a technique of propagating data in a network according to a transaction allocation scheme that complies with the rules of at least one of the proposed sub-systems/heuristics. The method 700 is implemented by a node of, for example, a blockchain network, such as network 100 of FIG. 1. More specifically, the method 700 is performed by a node that participates in the DMP and is configured to generate or receive data packets of a first type (e.g. transactions) for propagation to the rest of the network.

In operation 702, the client associated with the node generates at least one data packet of a first type. The data packet may, for example, comprise a blockchain transaction.

In operation 704, the node collects a set of data packets of the first type during a first time period, T. That is, the node accumulates data packets of the first type over a period of time. The set includes the at least one generated data packet and at least one data packet of the first type that is received from one or more peer nodes in the network. In this way, the data packets generated by the node are mixed with those data packets of the same type that are received from neighbouring nodes.

In operation 706, a mapping of the data packets of the collected set to a plurality of neighbouring nodes connected to the node is determined. The mapping indicates an expected time of relay of each data packet of the set to the neighbouring nodes. This "mapping" is used to construct the individual local RDR tables for nodes of the network. One or more of the sub-systems/heuristics described in the present disclosure may contribute (in parallel or independently) to construction of the RDR tables. In particular, one or more different sub-mappings may be applied in determining the mapping of the collected data packets to neighbouring nodes. The sub-mappings may be of at least two different types. A first type of sub-mapping allocates any two data packets having a same source (i.e. originating node) for relay to different subsets of the neighbouring nodes. The "source mixing" and "relay mixing" sub-systems described in greater detail below are examples of this first type of sub-mapping. A second type of sub-mapping assigns different expected times of relay to any two data packets that are generated at the node or received by the node from peer nodes in a same time interval. The "time-of-arrival mixing" sub-system is an example of this second type of sub-mapping.

In operation 708, once the mapping of the data packets of the collected set to neighbouring nodes is determined, said data packets are transmitted to neighbouring nodes in accordance with the determined mapping.

It will be understood that the individual sub-systems may be independently implemented to update the transaction allocations defined in an RDR table. That is, each sub-system can be adopted separately for an RDR table, independently of the other sub-systems. Accordingly, the individual sub-systems may provide different ways of allocating transactions to relay nodes and, consequently, different techniques for propagating transactions.

Source Mixing

The principle underlying the source mixing sub-system is that transactions generated locally at a node should be transmitted to non-overlapping subsets of peers. By way of illustration, if node x generates two transactions $tx_i$ and $tx_{i+1}$, the sets of peers selected for relay of those transactions, denoted $S(tx_i)$ and $S(tx_{i+1})$, respectively, satisfy $$S(tx_i) \neq S(tx_{i+1})$$

That is, the sets of peers for two subsequent transactions differ by at least one peer. This inequality can help to complicate any malicious search for patterns for the initial relay of transactions generated at a node. This concept can be extended to a source mixing of degree $\delta^{SM}$ as follows:

$$S(tx_{i+a}) \neq S(tx_{i+b}), \forall (a, b) \in [0, \delta^{SM}-1], a \neq b$$

Figure 9:
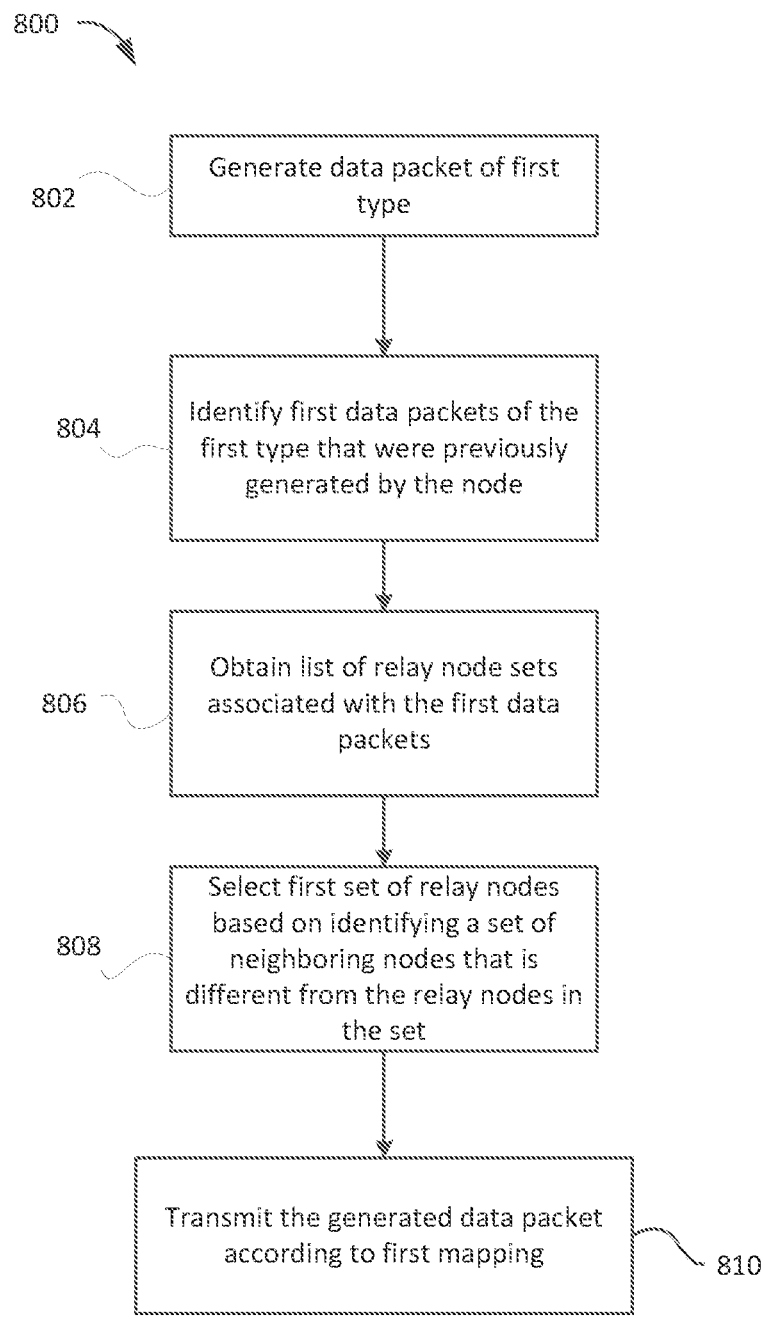
FIG. 9 shows, in flowchart form, an example process for transmitting data packets generated at a node in a blockchain network.

Reference is now made to FIG. 9, which shows in flowchart form, an example method 800 for transmitting data packets generated at a node in a network. The method 800 represents a technique of propagating data in a network according to a transaction allocation scheme that complies with the rules of a source mixing sub-system/heuristic. The method 800 is implemented by a node of, for example, a blockchain network, such as network 100 of FIG. 1. More specifically, the method 800 is performed by a node that participates in the DMP and generates data packets of a first type (e.g. transactions) for propagation to the rest of the network.

In operation 802, the client associated with the node generates at least one data packet of a first type. The data packet may, for example, comprise a blockchain transaction.

The node determines a first mapping of the at least one generated data packet to its neighbouring nodes (i.e. peers). In particular, a plurality of subsets of peers are selected for relaying the data packets that are generated at the node. Each data packet is associated with a specific subset of relay nodes by the first mapping. For each data packet, in operation 804, a predetermined number of first data packets of the first type that were previously generated by the node are identified. These may be data packets which have already been transmitted to peers by the node, or data packets which were previously generated but have yet to be relayed to the node's peers.

In operation 806, a list of relay node sets associated with the first data packets is obtained. The relay node sets comprise those neighbouring nodes (peers) to which the first data packets are respectively relayed (or allocated for relaying). That is, the relay node sets indicate the subsets of peers of the node to which individual ones of the first data packets are allocated.

In operation 808, a first set of relay nodes is selected based on identifying a set of neighbouring nodes that is different from the relay node sets in the list obtained in operation 806. For example, the first set of relay nodes may be chosen by arbitrarily selecting a set of two or more neighbouring nodes that is not included in the obtained list of relay node sets. In some implementations, a requirement may be imposed that the selected first set be different from the relay node sets in the obtained list by two or more peers. That is, an upper limit may be set on the number of elements belonging to the intersecting set between the selected first set of relay nodes and any one of the relay node sets in the obtained list.

The method 800 may be performed by a node after a single data packet is generated at the node, or after the node collects a plurality of generated data packets. In particular, the node may generate and accumulate data packets of a first type over a period of time (similar to the RDR stage of DMP) and determine a first mapping of the accumulated data packets to relay node sets. In these cases, the data packets may be respectively allocated to arbitrarily selected subsets of relay nodes, ensuring that no two such subsets are equal to each other.

The number of neighbouring nodes that are selected for inclusion in the first set of relay nodes may be arbitrarily determined. In at least some implementations, the number of peers selected for the first set is bounded according to the bandwidth requirements (e.g. cumulative amount of incoming and outgoing data within fixed timeframes) of the propagating node. In particular, the number of peers selected for relay of locally generated transactions may be adjusted in order to address network load issues or to improve source obfuscation. For example, the number of peers included in the first set may be defined by $$m(tx_i) = m^{SM} \pm rnd(\xi^{SM})$$

where $m^{SM}$ is a nominal value representing the average number of peers selected for relay in source mixing sub-system and $rnd(\xi^{SM})$ represents a random integer number between 0 and $\xi^{SM}-1$.

The selection of the first set of relay nodes can then be set in the first mapping in association with the respective data packet. In other words, the first mapping may indicate that the data packet is associated with (i.e. allocated to) the first set of relay nodes. In operation 810, the data packet is transmitted according to the determined first mapping.

Relay Mixing

The relay mixing sub-system is premised on the concept that transactions received by a node should be relayed to non-overlapping subsets of the node's peers. Using the parameter $\lambda$ to represent the number of elements belonging to the intersecting set between the relaying peers selected for two different transactions received by the same node, the idea behind relay mixing can be captured by $$|S(tx_{j+a}) \cap S(tx_{j+b})| \leq \lambda \ \forall (a, b) \in [0, \delta^{RM}-1], \ a \neq b \quad (1)$$

where $\delta^{RM}$ is the degree of relay mixing. The inequality (1) defines a transaction allocation problem of finding allocations of transactions to relay nodes that satisfy the inequality. The relay mixing strategy can thus be controlled by varying the parameter $\lambda$ in (1). Once $\lambda$ is set, an iterative search for a suboptimal solution to the transaction allocation problem is performed. The relay mixing sub-system may require that the inequality (1) be satisfied for each peer $\rho_i$ from which the node receives one or more transactions. For example, the last $\delta^{RM}$ transactions received $(tx_j, tx_{j+1}, \ldots, tx_{j+\delta^{RM}-1})$ from peer $\rho_i$ may be used to implement the relay mixing by requiring inequality (1) to be satisfied for those transactions. Accordingly, in some implementations, an individual parameter $\lambda_i$ may be defined for each peer $\rho_i$, respectively. In this way, source obfuscation may be implemented by creating an independent data structure for transaction relay for each peer $\rho_1, \rho_2, \ldots, \rho_m$ from which the node receives transactions, identifying allocations of the received transactions to relay nodes.

Alternatively, in other implementations, the parameter $\lambda$ may be a unique system parameter; a time-varying parameter $\lambda^t$ updated using a specific time window and information stored in the RDR table; or a time-varying parameter $\lambda_i^t$ for each peer and updated using a specific time window and information stored in the RDR table.

The number of combinations of transaction allocations for a generic peer is $C = \binom{m}{x}^{\delta^{RM}}$, where m is the number of peers of the node, $\delta^{RM}$ is the degree of relay mixing, and x is an average number of peers selected for relay. The iterative search for a suboptimal solution may proceed in several possible ways:

- Set a maximum number of iterations and select the transaction allocation with the smallest number of intersecting peers
- Set a maximum number of iterations but interrupt the process earlier if a given threshold of intersecting peers is reached
- Set a maximum number of iterations and increase the value of $\lambda$ if the requirements are not met, then restart the process
- Set a maximum number of iterations and modify the value of $\chi$ if the requirements are not met, then restart the process
- Set a maximum number of iterations and reduce the value of m if the requirements are not met, then restart the process Another set of approaches can be considered if the maximum number of iterations is substituted with a fixed time window $\Delta T_{RM}$.

The number of neighbouring nodes that are selected for inclusion in the set of relay nodes may be arbitrarily determined. In at least some implementations, the number of peers selected for the set is bounded according to the bandwidth requirements (e.g. cumulative amount of incoming and outgoing data within fixed timeframes) of the propagating node. In particular, the number of peers selected for relay of locally generated transactions may be adjusted in order to address network load issues or to improve source obfuscation. For example, the number of peers included in the first set may be defined by $$m(tx_i) = m^{RM} \pm rnd(\xi^{RM})$$

where $m^{RM}$ is a nominal value representing the average number of peers selected for relay in relay mixing sub-system and $rnd(\xi^{RM})$ represents a random integer number between 0 and $\xi^{RM}-1$. In some embodiments, $\xi^{SM}$ and $\xi^{RM}$ may have the same value.

Figure 10:
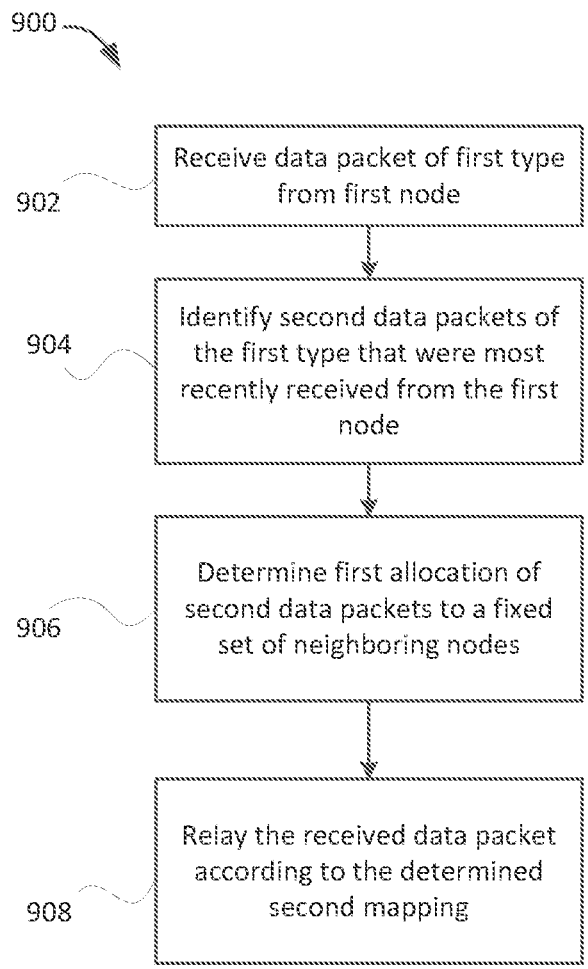
FIG. 10 shows, in flowchart form, an example process for relaying data packets received at a node in a blockchain network.

Reference is now made to FIG. 10, which shows in flowchart form, an example method 900 for relaying data packets received at a node in a network. The method 900 represents a technique of propagating data in a network according to a transaction allocation scheme that complies with the rules of a relay mixing sub-system/heuristic. The method 900 is implemented by a node of, for example, a blockchain network, such as network 100 of FIG. 1. More specifically, the method 900 is performed by a node that participates in the DMP and receives data packets of a first type (e.g. transactions) for propagation to the rest of the network.

In operation 902, the client associated with the node receives at least one data packet of a first type. The data packet may, for example, comprise a blockchain transaction.

The node determines a second mapping of the at least one received data packet to its neighbouring nodes (i.e. peers). In particular, a plurality of subsets of peers are selected for relaying the data packets that are generated at the node. Each data packet is associated with a specific subset of relay nodes by the second mapping. For each data packet, in operation 904, a predetermined number of second data packets of the first type that were most recently received by the node are identified. These may be data packets which have already been transmitted to peers by the node, or data packets which were previously received but have yet to be relayed to the node's peers.

In operation 906, a first allocation of the second data packets to a fixed set of neighbouring nodes is determined. In particular, the first allocation is selected from one or more allocations of the second data packets to neighbouring nodes that satisfy a predetermined condition. This operation corresponds to the iterative search for a suboptimal solution to inequality (1) described above. That is, of the allocations of data packets to relay nodes that satisfy (1), a unique allocation (e.g. an allocation with fewest intersecting peers) is determined. As captured by (1), an allocation of second data packets to a fixed set of neighbouring nodes satisfies a predetermined condition if, for any two of the second data packets, a number of neighbouring nodes to which both said second data packets are allocated (for relaying) is less than or equal to a predefined threshold value.

The unique allocation of the second data packets to neighbouring nodes identified in operation 906 can then be set in the second mapping. In other words, the second mapping may indicate the relay nodes to which the second data packets (i.e. data packets received by the node from its peers) are respectively allocated. In operation 908, the at least one received data packet is relayed according to the determined second mapping.

The method 900 may be performed by a node after a single data packet is received at the node, or after the node collects a plurality of received data packets. In particular, the node may receive and accumulate data packets of a first type over a period of time (similar to the RDR stage of DMP) and determine a mapping of the accumulated data packets to relay node sets. In these cases, the data packets may be respectively allocated to arbitrarily selected subsets of relay nodes, ensuring that no two such subsets are equal to each other.

Destination Mixing

Figure 11:
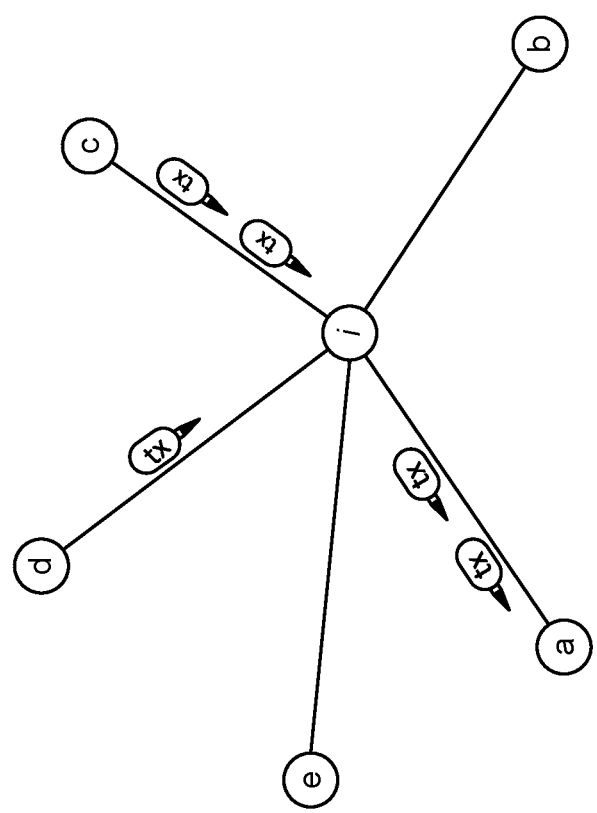
FIG. 11 illustrates an example of destination mixing in the propagation of data packets in a network of nodes.

The destination mixing heuristic captures the idea that an outbound connection of a node should carry out transactions relayed by different peers. This heuristic may be considered as a special case of the relay mixing sub-system, since the latter involves the creation of non-overlapping subsets of peers for relay from the same source peers. In method 900, destination mixing may be implemented by ensuring that, at operation 906, for any two of the first nodes (i.e. nodes from which the node receives data packets), the set of all second data packets received from said two first nodes is allocated to at least two different neighbouring nodes in the first allocation. For example, FIG. 11 illustrates an example of destination mixing for a node i. The destination mixing sub-system ensures that node α does not receive, in a given time window $\Delta T_{DM}$ two transactions relayed by the same node c. Thus, only one of the two transactions received at node i from node c is relayed to node α.

In some implementations, the destination mixing may be enabled on a different subset of peers for each time window $\Delta T_{DM}$. For example, the subsets may be allocated in a similar way to the one described for source mixing with parameters ($m^{DM}$, $\delta^{DM}$, $\xi^{DM}$) This strategy may contribute to de-correlation of source and destination for a given transaction.

Time-of-Arrival Mixing

Figure 12:
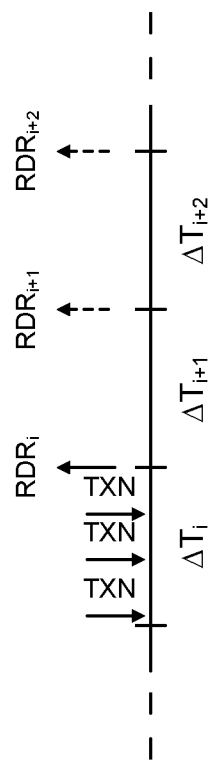
FIG. 12 illustrates an example of a delayed relay of data packets in a network of nodes.

The time-of-arrival mixing heuristic implements a delayed relay of data packets, in order to help de-correlate source and destination information about a data packet relay. For example, data packets (e.g. transactions) that are collected (or generated) within a time window $\Delta T_i$ (e.g. in RDR stage of DMP) may be scheduled for relay at the end of $\Delta T_i$ ($RDR_i$ in FIG. 12). The time-of-arrival mixing sub-system delays the relay past $RDR_i$. In some implementations, the relay of data packets may be delayed by a multiple $q\Delta T_i$, e.g. $RDR_i$, $RDR_{i+1}$, $RDR_{i+2}$, etc. Thus, in accordance with the time-of-arrival heuristic, relaying a received (or generated) data packet by a node includes determining a next scheduled time for relay of received data packets to neighbouring nodes and relaying the data packet a predetermined amount of time after the next scheduled time for relay. All transactions collected within $\Delta T_i$ may be relayed at $\Delta T_i + q\Delta T$, or each transaction j collected within $\Delta T_i$ may be relayed at a given $\Delta T_i + q_j \Delta T$.

The random variable q may, in some examples, have a negative exponential probability density function, $$pdf_q(\chi) = cxe^{-(x+g)}$$

where c and g are a multiplicative and an additive constant, respectively.

Source Control

A malicious peer may attempt to push the same data packet (or group of data packets) multiple times to a given node i to try to find a pattern in the local relay strategy of i. For example, a malicious peer node may create two connections to node i and monitor how incoming and outgoing traffic for i are correlated. The source control sub-system is implemented by setting a particular threshold for the number of data packets that can be received from each peer. If a peer exceeds the threshold for a given data packet, its connection will be permanently or temporarily closed. The number of instances in which a node receives a given data packet, such as a blockchain transaction, may be stored in the RDR table.

Load Balancing

Load balancing may be used to periodically perform a shuffle of data packets already allocated for relay to peers by the other sub-systems. The purpose of the load balancing module is to average the relay distribution among the peers, to avoid traffic overload in some peer connections or single point of failures. Two different approaches to load balancing may be implemented:

Each data packet j has the same weight $w_j$ despite their size (i.e. number of inputs, number of outputs, unlocking and locking script size)

Each data packet j has its own weight $w_j$, proportional to its size in bytes

For example, in method 800, a second allocation of the second data packets to the fixed set of neighbouring nodes may be determined, the second allocation being a re-arrangement of the first allocation to account for balancing traffic at output interfaces of the node. A cumulative value $c_i$ can be computed for each peer i over the number of data packets $n_i$ scheduled to relay:

$$c_i = \sum_{k=1}^{n_i} w_k(i)$$

Subsequently, an iterative method is performed to shuffle the data packets to relay and obtain an average c* value for each peer:

$$c^* = \frac{\sum_{i=1}^{m} c_i}{m}$$

Various different heuristics addressing this shuffle of data packets may be available. For example, different priorities may be assigned to different sub-systems, in order to anticipate the relay of a subset of data packets or enhance the load balancing for the outgoing traffic. Moreover, the execution of different sub-systems can introduce duplicates or inconsistent allocations of data packets, which need to be solved before the activation of the relay.

Node Bandwidths and DMP

The Diffusion Mixer Protocol may be configured to account for a network node's available bandwidths in its various links/channels to neighbouring nodes. Various aspects of the transmission of data packets between nodes of a network, including quantity and timing of transmission, can depend on available node-to-node bandwidth capacities.

In the context of propagation of data packets in a network of nodes, it is desirable to balance the ability to enhance anonymity of the source and destination of data packets that are relayed by a network node with efficient utilization of available bandwidth resources of the network node. In particular, an algorithm for assigning data relays to peers of a network node (e.g. Diffusion Mixer Protocol) may advantageously be moderated by resource constraints of the network node. For example, in some instances, various constraints may be imposed on one or more parameters of a data relay assignment algorithm (e.g. setting upper and/or lower limit) based on resource limitations of the network node.

By way of illustration, when a node transmits data packets to one or more of its peers, the node may need to contemplate the available bandwidths in its links to the neighbouring nodes, such that data packets can be judiciously allocated for relay to the node's peers. Techniques for enhancing anonymity of source of relayed data may result in high bandwidth usage. For example, if a network node selects a large number of entry nodes for relaying a data packet, the network node's output link capacity may be reduced to an undesirable level. As another example, delaying the relay of one or more data packets to effect time-of-arrival mixing (in RDR) may cause node-to-node channels to be occupied beyond an acceptable level. An algorithm which enables control of parameters in dependence on resource constraints of the network node can facilitate both improved performance of data relay and network traffic management.

Figure 13:
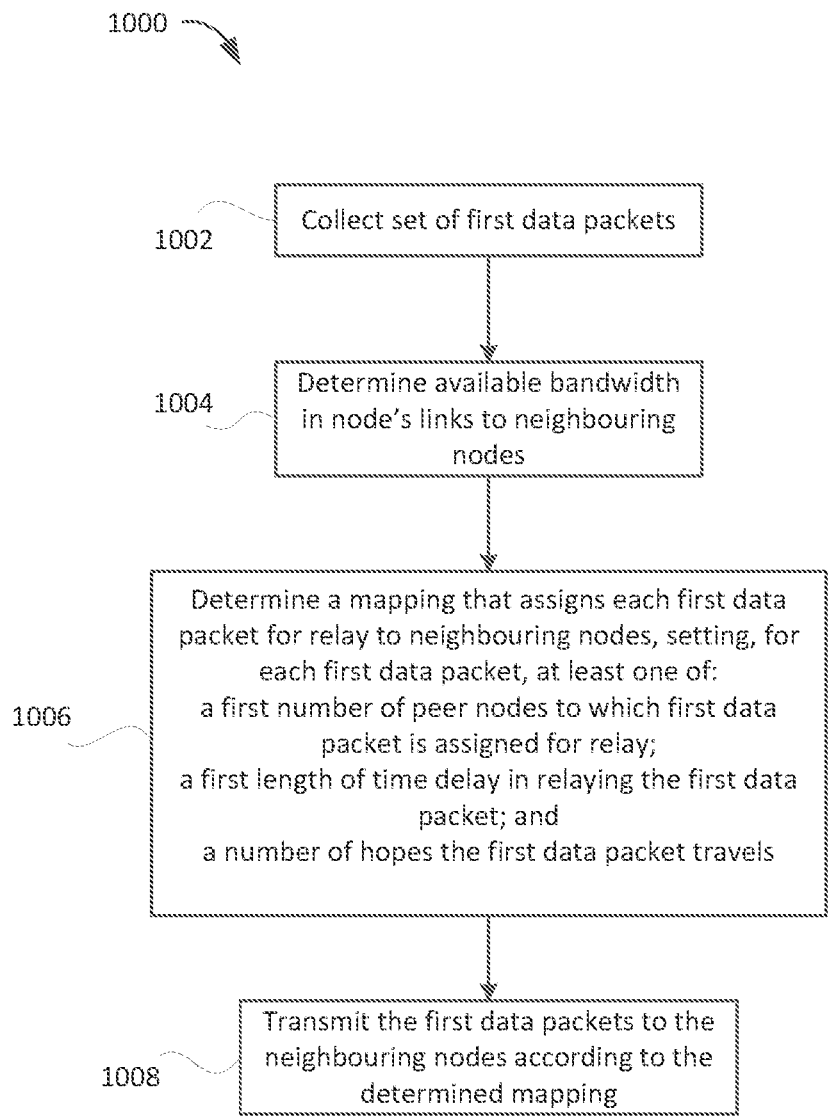
FIG. 13 shows, in flowchart form, an example process for determining data relay assignments based on bandwidth constraints of a node.

Reference is now made to FIG. 13, which shows an example process 1000 for propagating data packets in a network of nodes. More specifically, the process 1000 represents a technique for determining data relay assignments based on bandwidth constraints of a network node. The method 1000 is implemented by a node of, for example, a blockchain network, such as network 100 of FIG. 1. In particular, the method 1000 is performed by a node that participates in the DMP and receives data packets of a first type (e.g. transactions) for propagation to the rest of the network.

In operation 1002, the node collects a set of first data packets during a first time period, T. That is, the node accumulates first data packets over a fixed duration of time. The set includes at least one first data packet that is received from one or more peer nodes in the network. In a blockchain network, during the time period T, the node accumulates a set of transactions by monitoring the network for incoming transactions to be relayed. The length of time period T may be predefined.

In operation 1004, the node (or an entity different from the node) determines an available bandwidth in the node's links to a plurality of its neighbouring nodes. The node may determine the bandwidth and throughput in each of its links/channels to neighbouring nodes In particular, a numerical value or indicator of available bandwidth in each of at least one of the node's links may be obtained. In some implementations, a value/indicator which represents overall available bandwidth in all of the node's outgoing links may be obtained. For example, a value/indicator representing the percentage of the node's links that is available for participating in the process 1000 of propagating data packets may be derived.

Additionally, a parameter representing a desirable allocation of the node's bandwidths to data relay (i.e. Diffusion Mixer Protocol) may be determined. For example, the parameter may represent a maximum amount of bandwidth that can be allocated. The value of the parameter may, for example, be manually set by an entity controlling the node, a collection of nodes, and/or a network that includes the node. Alternatively, the value of the parameter may be automatically updated based on detected changes in available bandwidths of the node, as will be explained in greater detail below.

In operation 1006, a mapping that assigns each of the first data packets for relay to one or more neighbouring nodes is determined. That is, a relay assignment of data packets to peers of the node is derived. The mapping indicates an expected time of relay of one or more of the first data packets collected by the node in operation 1002.

The relay assignment of the first data packets is determined by using the available bandwidth information (obtained in operation 1004) as a basis for setting, for each of the first data packets, at least one of various parameters of the data relay, including: a first number of peer nodes to which the first data packet is assigned for relay by the mapping; a first length of time delay in relaying the first data packet to one or more peer nodes; and a number of hops the first data packet travels from the network node. That is, one or more of these parameters of the data relay process may be set or adjusted based on the node's available bandwidths in its links to neighbouring nodes.

In some implementations, information regarding a node's available bandwidth may be used to set the parameters of one or more of the sub-systems (e.g. source mixing, relay mixing, etc.) described above, or other heuristics that are employed to control the relay assignments of data packets to peer nodes.

As previously explained, the number of peers selected for a data packet relay in the RDR may be bounded as follows:

$$m_{min} \leq m_{max} \leq m$$

where m represents the total number of peers of the network node. Given a parameter $\psi \in [0,1]$ representing an indication of available bandwidth(s) and an average number $\mu$ of relayed and/or generated data packets in a fixed time window (e.g. $\Delta T_{RM}$, $\Delta T_{SM}$), a set of configurations for the bounds of the number of peers may be derived:

If $\psi=1$, then $m_{max}=m$ and $m_{min}=\max(0, 2\mu-m_{max})$
If $\psi=0$, then $m_{max}=1$ and $m_{min}=0$ That is, $\mu$ corresponds to the central point in $[m_{min}, m_{max}]$. Minimum and maximum boundaries can be represented as functions of $\psi$:

$m_{max}(\psi)=(m-1)\psi+1$
$m_{min}(\psi)=(2\mu-m_{max}(\psi))\psi=(2\mu-(m-1)\psi+1)\psi=(2\mu+1)\psi-(m+1)\psi^2$ where the formulas are evaluated to the nearest integer values. In other words, based on the available bandwidth of the network node (represented by $\psi$), a range of possible values for the number of peers to which the first data packet is assigned for relay by the mapping may be determined. A number in the determined range can then be selected (e.g. arbitrarily, randomly) to set as the first number of peer nodes that the mapping will relay the first data packet to.

If $2\mu-m_{max}\leq 0$, then $m_{min}$ is set to 0. In general, the larger the values of $\psi$ and $m$, the larger the range $[m_{min}, m_{max}]$. That is, with more available bandwidth and peer nodes, there may be greater flexibility in terms of the number of peer nodes which should be set to receive relay of the first data packet.

In some implementations, the average $\mu$ may be modelled to vary as a function of time. The value of $\mu$ (for source mixing and relay mixing) may, for example, be modelled using sinusoidal functions:

$$\mu_{RM}(t) = \mu^* \cos\left(\frac{t}{k\Delta T_{RM}}\pi\right)$$

$$\mu_{SM}(t) = \mu^* \cos\left(\frac{t}{k\Delta T_{SM}}\pi\right)$$

where $\mu^*$ represents an expected value of $\mu(t)$ and $k$ controls the period of the sinusoid.

The range of possible values for the number of peers selected to receive relay of a first data packet ($m(tx_i)$) may be further refined. For example, in the source mixing subsystem scenario, $m(tx_i)=m^{SM}\pm rnd(\xi^{SM})$ where $m^{SM}$ is a nominal value representing the average number of peers selected for relay in source mixing subsystem and $rnd(\xi^{SM})$ represents a random integer number between 0 and $\xi^{SM}-1$. An example probability distribution function for $\xi^{SM}$ is a discretized Gaussian, with 95% of energy in the range $[-\xi^{SM}, \xi^{SM}]$. A more general "skew normal distribution" can be characterized by the following probability density function, PDF:

$$PDF_\xi(\chi, \omega, \rho, \alpha) = \frac{2}{\omega\sqrt{2\pi}} e^{-\frac{(\chi-\rho)^2}{2\omega^2}} \int_{-\infty}^{\alpha\left(\frac{\chi-\rho}{\omega}\right)} e^{-\frac{t^2}{2}} dt$$

Since values to the right of the mean value may be preferred to help the initial propagation of data packets in the network, the skew may be useful to represent the asymmetry between the two sides of the distribution in the case of source mixing. The function has the following mean $\mu_\xi$ and variance $\sigma_\xi^2$:

$$\mu_\xi(\omega, \rho, \alpha) = \rho + \frac{\alpha\omega}{\sqrt{1+\alpha^2}}\sqrt{\frac{2}{\pi}}$$

$$\sigma_\xi^2(\omega, \alpha) = \omega^2\left(1 - \frac{2\alpha^2}{\pi(1+\alpha^2)}\right)$$

In the above equations, $\omega$, $\rho$ and $\alpha$ represent the scale, location, and shape of the curve, respectively. Thus, $\mu_\xi$ and $\sigma_\xi^2$ may be configured according to (1) the range $[m_{min}, m_{max}]$ and (2) the nominal value representing the average number of peers selected for relay, i.e. $\mu_{SM}(t)$. In some implementations, the following configuration may be suitably used in defining the mean and variance:

$$\mu_\xi(\omega, \rho, \alpha) = \mu_{SM}(t)$$

$$\sigma_\xi^2(\omega, \alpha) = \frac{m_{max} - m_{min}}{6}$$

A third equation can be selected to solve for the unknown variables, $\omega$, $\rho$, $\alpha$. For example, the correlation between $\alpha$ and $\psi$ may be represented by:

$\alpha = 8\psi - 4$ or $\alpha = 8.6 \tanh(\psi - 0.5)$

Another parameter which may be controlled based on the available bandwidths of the network node is time of delay in relaying of a data packet. Delayed relay (i.e. transmitting a data packet a predetermined length of time after an expected time of relay that is indicated by a relay assignment/mapping) may be useful in de-correlating source and destination information about a data packet. For example, a data packet collected or generated within a time window $\Delta T$ may be relayed with a delay equal to a multiple $q\Delta T$ of $\Delta T$, where $q$ is a random variable. In order to balance the degree of de-correlation and the extent of delay in relay, the random variable $q$ may have a negative exponential probability density function.

In general, the length of delay in relay may be inversely proportional to a node's available bandwidths. In particular, the lower the value of $\psi$, the longer the delay of relay. This relation may be expressed using the following equation:

$$\Delta T = \frac{n\Delta T^*}{\psi}$$

where $n$ represents an estimate of the number of data packets received in the previous time window(s), while $\Delta T^*$ represents the nominal time window, i.e. the lower-bound for the delayed relay. The value of $\Delta T^*$ may vary based on factors such as average connection times or the node's centrality (i.e. number of incoming connections to the node) within a network of nodes.

In operation 1008, the first data packets of the collected set are transmitted to the neighbouring nodes of the network node according to the mapping determined in operation 1006. In some implementations, only a subset of the collected first data packets are transmitted in accordance with the relay assignments specified by the mapping.

Figure 14:
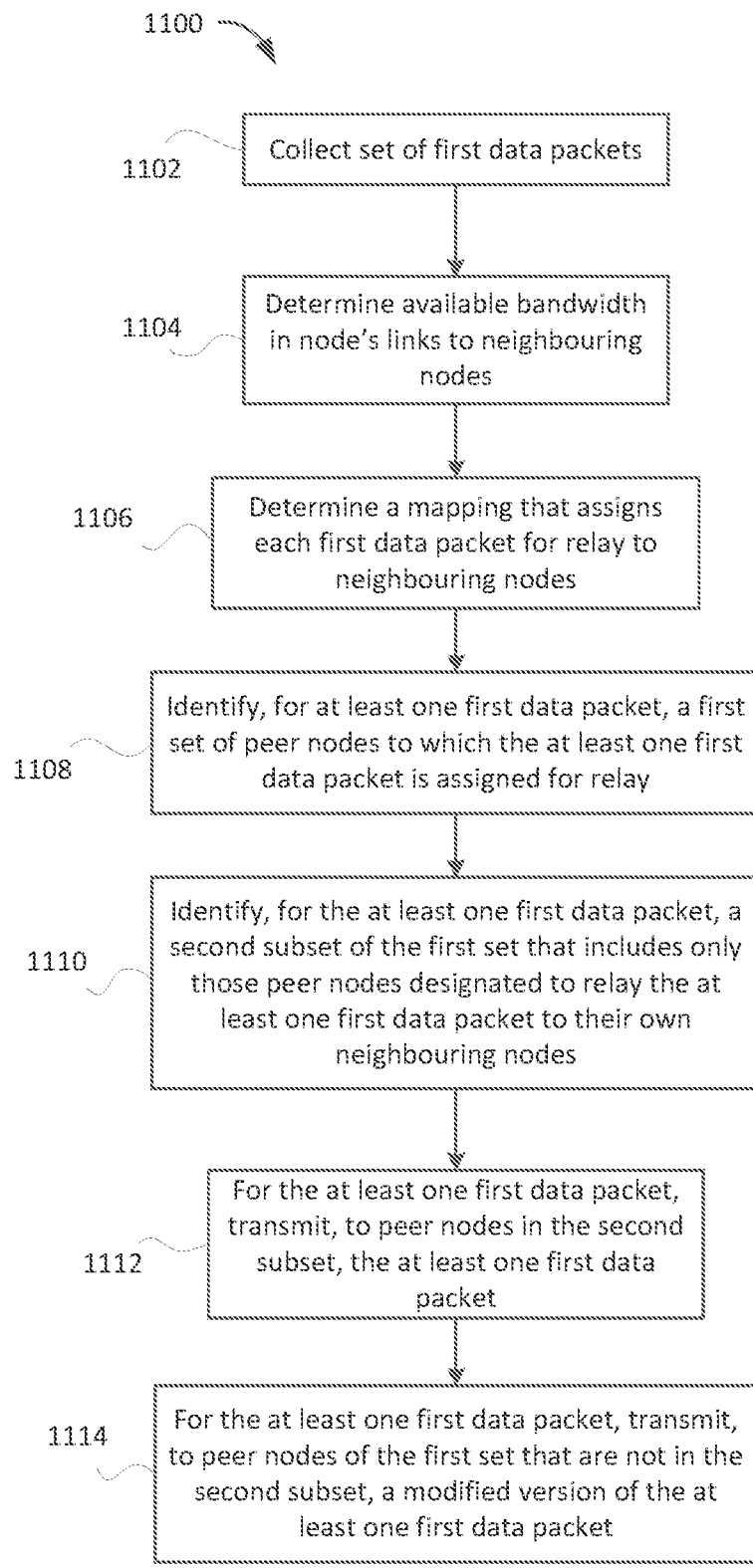
FIG. 14 shows, in flowchart form, another example process for determining data relay assignments based on bandwidth constraints of a node.

Reference is now made to FIG. 14, which shows another example process 1100 for propagating data packets in a network of nodes. The method 1100 is implemented by a node of, for example, a blockchain network, such as network 100 of FIG. 1. In particular, the method 1100 is performed by a node that participates in the DMP and receives first data packets (e.g. transactions) for propagation to the rest of the network.

The process 1100 introduces a technique of setting a number of hops that a first data packet will travel once it is propagated by the network node. In operation 1102, a set of first data packets is collected, and the available bandwidths for the node in the node's links to neighbouring nodes is determined in operation 1104. A mapping of the first data packets collected by the node is then determined in operation 1106, the mapping assigning each of the first data packets for relay to one or more neighbouring nodes.

For at least one first data packet selected from the set of first data packets, a first set of peer nodes to which the at least one first data packet is assigned for relay is identified, in operation 1108. This identification is done with reference to the mapping determined in operation 1104.

In operation 1110, a second subset of the first set is identified. The peer nodes of the second subset are designated to relay the at least one first data packet to their own neighbouring nodes upon receiving the at least one first data packet from the network node. That is, the second subset of peer nodes contributes to the propagation of the at least one first data packet throughout the network, by forwarding the at least one first data packet to their own peers. When the at least one first data packet is relayed to the peer nodes of the second subset, the propagation of the at least one first data packet continues to additional nodes of the network. On the other hand, when the at least one first data packet is relayed to those peer nodes of the first set that are not included in the second subset, those peer nodes will not forward the at least one first data packet to any of their neighbouring nodes.

In operation 1112, for the at least one first data packet, the node transmits the at least one first data packet to the peer nodes included in the second subset. In operation 1114, for the at least one first data packet, the node transmits a modified version of the at least one first data packet to the peer nodes of the first set that are not included in the second subset. The modified data packet includes the at least one first data packet that is modified to indicate that further relays of the at least one first data packet to peer nodes are prohibited. In this way, a group of peer nodes (i.e. the peers of the second subset) are configured to continue the propagation of the at least one first data packet, while a different group of peer nodes (i.e. the peers not included in the second subset) merely receive the at least one first data packet from the network node but do not relay it to their peers. By distinguishing those data packets which will be propagated further from those data packets that travel for a single hop from the network node, it may be possible to decrease the number of redundant relays of data packets in a data propagation scheme within a network of nodes.

For example, if two nodes have the same set of peers, it would be redundant for a data packet that is relayed to the two nodes to be further propagated to their peers by both of the two nodes, as this would result in duplicates of the data packet being transmitted to said peers. By limiting the number of hops travelled by data packets that are likely to be already destined for other identifiable nodes of the network, unnecessary consumption of network bandwidth may be curbed or reduced.

The data packets that are forwarded to peers of the first set not included in the second subset may be marked to distinguish them from those data packets which should be propagated further (i.e. forwarded to peers of the second subset). For example, an additional bit may be set in the at least one first data packet that is forwarded to a peer not included in the second subset to indicate that further relays of said data packet to other nodes is prohibited.

The at least one first data packet may, in some implementations, be arbitrarily selected from the collected set of first data packets. Alternatively, the at least one first data packet may be selected based on determining that it had previously been transmitted by the network node to one or more peer nodes. As another example, the at least one first data packet may be selected by setting, randomly, every $n_{1hop}$ relayed data packet. The value of $n_{1hop}$ depends on both m and $\psi$. In particular, generally, the higher the value of m and $\psi$, the higher $n_{1hop}$. For example, the correlation can be modelled with a second-degree function such as:

$$n_{1hop}=(m-1)\psi^2+1$$

Figure 15:
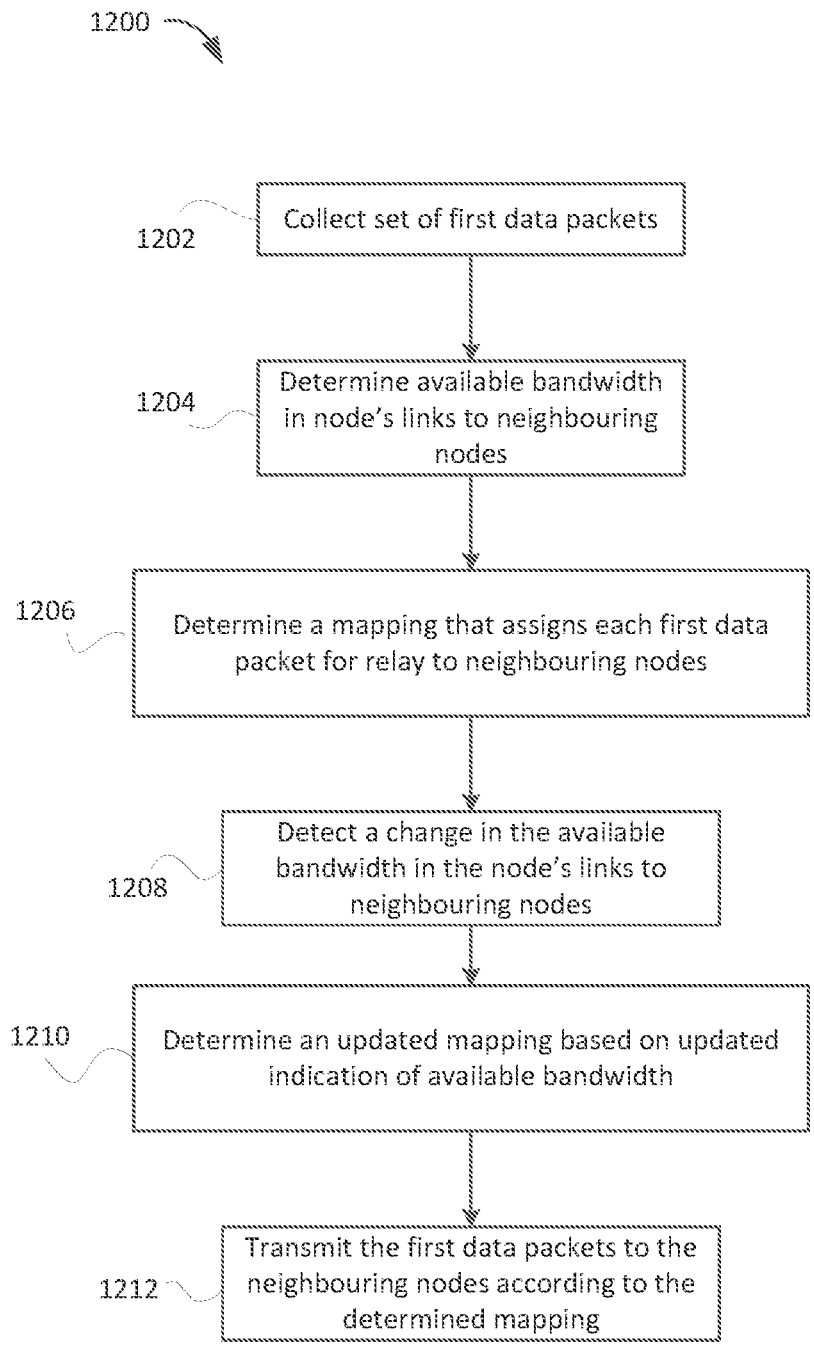
FIG. 15 shows, in flowchart form, an example process for updating data relay assignments based on changes in bandwidth constraints of a node.

Reference is now made to FIG. 15, which shows another example process 1200 for propagating data packets in a network of nodes. The method 1200 is implemented by a node of, for example, a blockchain network, such as network 100 of FIG. 1. In particular, the method 1200 is performed by a node that participates in the DMP and receives first data packets (e.g. transactions) for propagation to the rest of the network.

The node collects a set of first data packets in operation 1202, and determines the available bandwidths in the node's links to neighbouring nodes in operation 1204. A mapping/relay assignments of the data packets to peers is then determined in operation 1206.

In operation 1208, a change in the available bandwidths of the network node is detected. The bandwidths available may be increased or decreased, depending on other communication activities of the network node. The change may be detected in real-time by the network node, and in operation 1210, an updated mapping of the data packets for relay to peer nodes is determined in real-time, based on an updated indication of available bandwidth. In particular, one or more parameters of the mapping may be set based on the updated information regarding the available bandwidth, the factors including: a first number of peer nodes to which the first data packet is assigned for relay by the mapping; a first length of time delay in relaying the first data packet to one or more peer nodes; and a number of hops the first data packet travels from the network node.

In operation 1212, the first data packets are transmitted to the neighbouring nodes of the network node based on the updated mapping/relay assignments.

The information regarding the available bandwidths of a network node may influence the decision of which diffusion mode to employ during the DMP. More specifically, a network node may determine whether to switch to the RDR mode or standard diffusion mode, based on the currently available bandwidths in the node's links to its neighbours. The switch between the modes of diffusion may be effected if: the processing overhead generated by the RDR is too high; available bandwidth does not require any network optimization; and local system is set to periodically alternate between the two diffusion modes.

Figure 16:
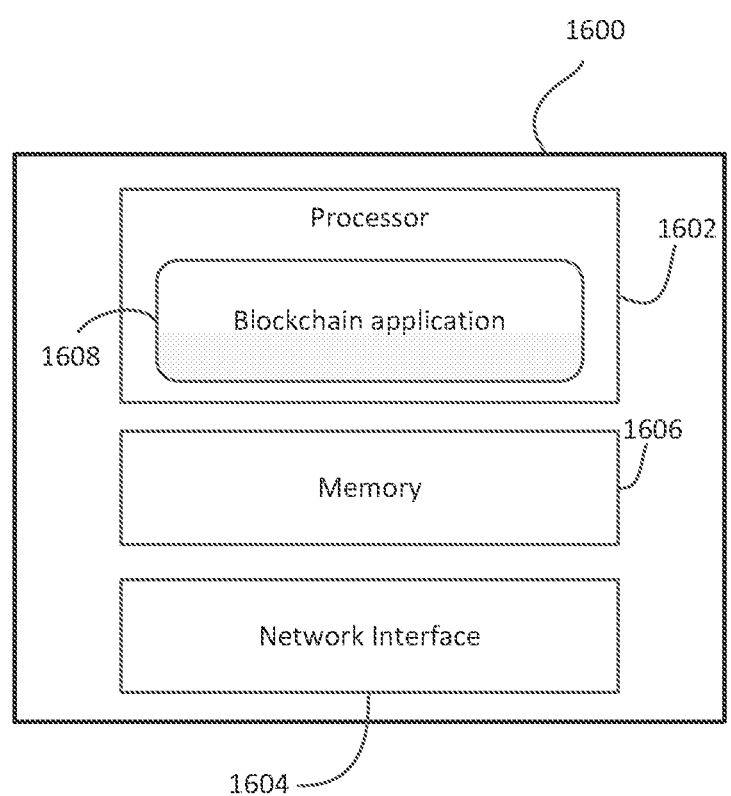
FIG. 16 shows, in block diagram form, an example blockchain node.

Reference is now made to FIG. 16, which shows, in block diagram form, a simplified example of a participating node 1600. The node 1600 includes a processor 1602, which may include one or more microprocessors, application specific integrated chips (ASICs), microcontrollers, or similar computer processing devices. The node 1600 further includes memory 1604, which may include persistent and non-persistent memory, to store values, variables, and in some instances processor-executable program instructions, and a network interface 1606 to provide network connectivity over wired or wireless networks.

The node 1600 includes a processor-executable blockchain application 1608 containing processor-executable instructions that, when executed, cause the processor 1602 to carry out one or more of the functions or operations described herein.

It will be understood that the devices and processes described herein and any module, routine, process, thread, application, or other software component implementing the described method/process for configuring the blockchain node may be realized using standard computer programming techniques and languages. The present application is not limited to particular processors, computer languages, computer programming conventions, data structures, or other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of propagating data packets in a network of nodes, the method comprising:
   collecting, at a network node, a set of first data packets during a first time period, the set including at least one first data packet received from one or more first nodes in the network;
   determining an available bandwidth in links of the network node to a plurality of neighbouring nodes connected to the network node;
   determining a mapping that assigns each first data packet of the set of first data packets for relay to one or more neighbouring nodes, the mapping indicating an expected time of relay of each first data packet of the set of first data packets, wherein determining the mapping includes using the available bandwidth as a basis for setting, for each first data packet of the set of first data packets, at least one of:
      a first number of peer nodes to which the first data packet is assigned for relay by the mapping,
      a first length of time delay in relaying the first data packet to one or more peer nodes, and
      a number of hops of the first data packet from the network node to a peer node; identifying, for at least one first data packet selected from the set of first data packets:
      a first set of peer nodes to which the at least one first data packet is assigned for relay; and
      a second subset of the first set, the second subset including only those peer nodes that are designated to relay the at least one first data packet to their own neighbouring nodes upon receiving the at least one first data packet from the network node; and
   transmitting the first data packets of the set to the plurality of neighbouring nodes according to the determined mapping.

2. The method claimed in claim 1, wherein determining the available bandwidth comprises obtaining an indicator of available bandwidth in each of at least one of the network node's links to the plurality of neighbouring nodes.

3. The method claimed in either claim 1, wherein determining the mapping comprises:
   determining, based on the available bandwidth, a range of possible values for a number of peer nodes to which the at least one first data packet is assigned for relay by the mapping; and
   selecting a number in the determined range to set as the first number of peer nodes.

4. The method claimed in claim 1, wherein transmitting the first data packets of the set to the plurality of neighbouring nodes according to the determined mapping comprises:
   for the at least one first data packet:
      transmitting, to peer nodes included in the second subset, the at least one first data packet; and
      transmitting, to peer nodes of the first set that are not included in the second subset, a modified data packet, the modified data packet including the at least one first data packet that is modified to indicate that further relays of the at least one first data packet to peer nodes are prohibited.

5. The method claimed in claim 4, further comprising setting an additional bit in the at least one first data packet to indicate that further relays of the at least one first data packet to peer nodes are prohibited.

6. The method according to claim 1, wherein the at least one first data packet is selected arbitrarily from the set of first data packets.

7. The method according to claim 1, wherein the at least one first data packet is selected based on determining that the at least one first data packet had previously been transmitted by the network node to one or more peer nodes.

8. The method according to claim 1, wherein transmitting the first data packets of the set to the plurality of neighbouring nodes according to the determined mapping comprises:
   for each of one or more first data packets of the set:
      determining a next scheduled time of relay for the first data packet to neighbouring nodes; and
      relaying the first data packet at a point in time that is the first length of time delay after the next scheduled time of relay.

9. The method claimed in claim 8, wherein the first length of time delay is inversely proportional to the available bandwidth.

10. The method according to claim 1, wherein the network node is configured to generate at least one first data packet and wherein determining the mapping comprises:
   for each of the at least one generated first data packet:
      identifying a predetermined number of first data packets that were previously generated by the network node;
      obtaining a list of relay node sets associated with the previously generated first data packets, the relay node sets including neighbouring nodes to which the previously generated first data packets are respectively relayed; and selecting a first set of relay nodes based on identifying a set of neighbouring nodes that is different from the relay node sets in the obtained list.

11. The method claimed in claim 10, wherein selecting the first set of relay nodes comprises arbitrarily selecting a set of two or more neighbouring nodes that is not included in the obtained list.

12. The method according to claim 1, further comprising detecting a change in the available bandwidth in the links of the network node to the plurality of neighbouring nodes, wherein determining the mapping includes using an updated indication of available bandwidth as a basis for setting, for each of the first data packets, at least one of:

a first number of peer nodes to which the first data packet is assigned for relay by the mapping;

a first length of time delay in relaying the first data packet to one or more peer nodes; and a number of hops of the first data packet from the network node.

13. A computer-implemented system for carrying out a method according to claim 1.

14. A non-transitory computer-readable medium storing instructions for adapting a computer system to perform a method according to claim 1.

15. A computer-implemented system for carrying out a method according to claim 2.

16. A computer-implemented system for carrying out a method according to claim 3.

17. A non-transitory computer-readable medium storing instructions for adapting a computer system to perform a method according to claim 2.

18. A non-transitory computer-readable medium storing instructions for adapting a computer system to perform a method according to claim 3.

* * * * *